US012617412B2

(12) United States Patent
Sun et al.

(10) Patent No.: US 12,617,412 B2
(45) Date of Patent: May 5, 2026

(54) SYSTEM AND METHODS FOR DETECTING ABNORMAL FOLLOWING VEHICLES

(71) Applicant: Ohio State Innovation Foundation, Columbus, OH (US)

(72) Inventors: Wei Sun, Columbus, OH (US); Kannan Srinivasan, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 98 days.

(21) Appl. No.: 18/583,068

(22) Filed: Feb. 21, 2024

(65) Prior Publication Data

US 2024/0278791 A1 Aug. 22, 2024

Related U.S. Application Data

(60) Provisional application No. 63/486,133, filed on Feb. 21, 2023.

(51) Int. Cl.
*B60W 40/09* (2012.01)
*B60W 30/16* (2020.01)
(Continued)

(52) U.S. Cl.
CPC ............ *B60W 40/09* (2013.01); *B60W 30/16* (2013.01); *B60W 50/14* (2013.01); *G06V 10/82* (2022.01);
(Continued)

(58) Field of Classification Search
CPC ...... B60W 30/16; B60W 40/09; B60W 50/14; B60W 2050/0056; B60W 2050/143;
(Continued)

(56) References Cited

U.S. PATENT DOCUMENTS 10,572,738 B2 * 2/2020 Leizerovich ........... G06V 20/40
10,572,739 B2 * 2/2020 Leizerovich ........... G06V 20/40
(Continued)

FOREIGN PATENT DOCUMENTS

CN 112512890 A * 3/2021 .............. G06N 3/02
CN 114299433 A * 4/2022
(Continued)

OTHER PUBLICATIONS

L. Steele, "How much time do american families spend in their cars?" https://www.fatherly.com/gear/how-much-time-do-american-families-spend-in-their-cars/, posted May 2018, accessed 2022.
(Continued)

*Primary Examiner* — Atul Trivedi
(74) *Attorney, Agent, or Firm* — Meunier Carlin & Curfman LLC

(57) ABSTRACT

Embodiments of the present disclosure a privacy-preserving defensive driving system that can detect abnormal following vehicles during driving. An example system may be configured to: continuously capture video data of the camera's field-of-view, detect following vehicles in the captured video data, and determine whether one or more following vehicles is exhibiting abnormal following behavior with respect to a first vehicle.

12 Claims, 9 Drawing Sheets

(51) Int. Cl.

| | |
|---|---|
| *B60W 50/00* | (2006.01) |
| *B60W 50/14* | (2020.01) |
| *G06V 10/82* | (2022.01) |
| *G06V 20/58* | (2022.01) |

(52) U.S. Cl.
CPC ..... *G06V 20/58* (2022.01); *B60W 2050/0056* (2013.01); *B60W 2050/143* (2013.01); *B60W 2050/146* (2013.01); *B60W 2420/403* (2013.01); *B60W 2554/802* (2020.02)

(58) Field of Classification Search
CPC ..... B60W 2050/146; B60W 2420/403; B60W 2554/4046; B60W 2554/802; G06V 10/764; G06V 10/82; G06V 20/58
USPC .......................................................... 701/1
See application file for complete search history.

(56) References Cited

U.S. PATENT DOCUMENTS

| | | | | |
|---|---|---|---|---|
| 11,074,813 | B2 * | 7/2021 | Julian | G06V 10/40 |
| 11,797,022 | B1 * | 10/2023 | Ballantyne | G06T 7/13 |
| 12,367,670 | B2 * | 7/2025 | Dasgupta | G06V 20/13 |
| 2013/0251193 | A1 * | 9/2013 | Schamp | G06V 20/64 |
| | | | | 382/103 |
| 2014/0104051 | A1 * | 4/2014 | Breed | G06V 20/56 |
| | | | | 340/435 |
| 2015/0127189 | A1 * | 5/2015 | Mehr | G05D 1/0295 |
| | | | | 701/1 |
| 2017/0243504 | A1 * | 8/2017 | Hada | G06N 5/04 |
| 2020/0363501 | A1 * | 11/2020 | Lau | G01S 15/931 |
| 2021/0070286 | A1 * | 3/2021 | Green | G06V 20/58 |
| 2021/0197846 | A1 * | 7/2021 | Thakur | B60Q 1/545 |
| 2022/0012503 | A1 * | 1/2022 | Peppoloni | G06V 20/56 |
| 2022/0012899 | A1 * | 1/2022 | Peppoloni | G06T 7/246 |
| 2022/0080977 | A1 * | 3/2022 | Ucar | B60W 40/09 |
| 2022/0161820 | A1 * | 5/2022 | Major | B60W 60/0013 |
| 2022/0332324 | A1 * | 10/2022 | Ucar | B60W 50/08 |
| 2022/0355802 | A1 * | 11/2022 | Chaves | B60W 40/09 |
| 2023/0116798 | A1 * | 4/2023 | Hillard | G01S 17/89 |
| | | | | 356/5.01 |
| 2023/0158982 | A1 * | 5/2023 | Wang | B60R 21/01336 |
| | | | | 701/47 |
| 2023/0176216 | A1 * | 6/2023 | Desai | G01C 21/12 |
| | | | | 356/5.01 |
| 2023/0273319 | A1 * | 8/2023 | Hillard | G01S 7/493 |
| | | | | 356/5.01 |
| 2023/0294727 | A1 * | 9/2023 | Oh | G06F 18/25 |
| | | | | 701/23 |
| 2023/0351638 | A1 * | 11/2023 | Wu | G06V 10/25 |
| 2023/0351769 | A1 * | 11/2023 | Wu | G06V 10/762 |
| 2024/0071064 | A1 * | 2/2024 | Chung | G06V 20/58 |
| 2024/0257536 | A1 * | 8/2024 | Ferroni | G06V 20/70 |
| 2024/0278791 | A1 * | 8/2024 | Sun | G06V 10/82 |
| 2024/0282118 | A1 * | 8/2024 | Zheng | G06V 20/58 |
| 2024/0326837 | A1 * | 10/2024 | Teman | B60W 50/16 |
| 2024/0336275 | A1 * | 10/2024 | Mazumder | G06V 10/25 |
| 2024/0400101 | A1 * | 12/2024 | Topan | B60W 60/0015 |
| 2024/0416963 | A1 * | 12/2024 | Li | G06V 10/82 |
| 2025/0020481 | A1 * | 1/2025 | Xie | G01C 21/3837 |
| 2025/0054288 | A1 * | 2/2025 | Liao | G06V 10/82 |
| 2025/0068724 | A1 * | 2/2025 | Yu | G06V 10/82 |
| 2025/0173996 | A1 * | 5/2025 | Choi | G06V 10/82 |
| 2025/0182435 | A1 * | 6/2025 | Singh | G06V 10/26 |
| 2025/0182494 | A1 * | 6/2025 | Singh | G06V 10/761 |
| 2025/0209676 | A1 * | 6/2025 | Huang | G06V 10/82 |
| 2025/0209696 | A1 * | 6/2025 | Jiang | G06T 11/60 |

FOREIGN PATENT DOCUMENTS

| | | | | | |
|---|---|---|---|---|---|
| DE | 102023133535 | A1 * | 6/2024 | | G06V 20/58 |
| WO | WO-2021118675 | A1 * | 6/2021 | | B60W 30/0956 |
| WO | WO-2025024574 | A1 * | 1/2025 | | G06V 10/82 |

OTHER PUBLICATIONS

CDC, "Violence prevention," https://www.cdc.gov/violenceprevention/intimatepartnerviolence/stalking/fastfact.html, 2022.

J. McNabb, M. Kuzel, and R. Gray, "I'll show you the way: Risky driver behavior when "following a friend"," Frontiers in psychology, vol. 8, p. 705, 2017.

A. U. Nambi, A. Virmani, and V. N. Padmanabhan, "Farsight: a smartphone-based vehicle ranging system," Proceedings of the ACM on Interactive, Mobile, Wearable and Ubiquitous Technologies, vol. 2, No. 4, pp. 1-22, 2018.

L. A. Pipes, "An operational analysis of traffic dynamics," Journal of applied physics, vol. 24, No. 3, pp. 274-281, 1953.

Y. Peng, S. Liu, and Z. Y. Dennis, "An improved car-following model with consideration of multiple preceding and following vehicles in a driver's view," Physica A: Statistical Mechanics and Its Applications, vol. 538, p. 122967, 2020.

R. E. Chandler, R. Herman, and E. W. Montroll, "Traffic dynamics: studies in car following," Operations research, vol. 6, No. 2, pp. 165-184, 1958.

W. Sun and K. Srinivasan, "On the feasibility of securing vehicle-pavement interaction," Proceedings of the ACM on Interactive, Mobile, Wearable and Ubiquitous Technologies, vol. 6, No. 1, pp. 1-24, 2022.

T. Sun, "10 most irritating things drivers do," https://www.thesun.co.uk/motors/3581304/what-grinds-motorists-gears-the-most-irritating-driving-habits-revealed/, 2017.

W. Sun and K. Srinivasan, "Allergie: Relative vehicular localization with commodity rfid system," in 2020 IEEE International Conference on RFID (RFID). IEEE, 2020, pp. 1-8.

S. Li, X. Fan, Y. Zhang, W. Trappe, J. Lindqvist, and R. E. Howard, "Auto++ detecting cars using embedded microphones in real-time," Proceedings of the ACM on Interactive, Mobile, Wearable and Ubiquitous Technologies, vol. 1, No. 3, pp. 1-20, 2017.

W. Jin, S. Murali, Y. Cho, H. Zhu, T. Li, R. T. Panik, A. Rimu, S. Deb, K. Watkins, X. Yuan et al., "Cycleguard: A smartphone-based assistive tool for cyclist safety using acoustic ranging," Proceedings of the ACM on Interactive, Mobile, Wearable and Ubiquitous Technologies, vol. 5, No. 4, pp. 1-30, 2021.

J. Redmon and A. Farhadi, "Yolov3: An incremental improvement," arXiv preprint arXiv:1804.02767, 2018.

A. Sarda, S. Dixit, and A. Bhan, "Object detection for autonomous driving using yolo [you only look once] algorithm," in 2021 Third International Conference on Intelligent Communication Technologies and Virtual Mobile Networks (ICICV). IEEE, 2021, pp. 1370-1374.

R.-C. Chen, V. S. Saravanarajan, H.-T. Hung et al., "Monitoring the behaviours of pet cat based on yolo model and raspberry pi," International Journal of Applied Science and Engineering, vol. 18, No. 5, pp. 1-12, 2021.

S. S. Sumit, J. Watada, A. Roy, and D. Rambli, "In object detection deep learning methods, yolo shows supremum to mask r-cnn," in Journal of Physics: Conference Series, vol. 1529, No. 4. IOP Publishing, 2020, p. 042086.

T.-Y. Lin, M. Maire, S. Belongie, J. Hays, P. Perona, D. Ramanan, P. Dollár, and C. L. Zitnick, "Microsoft coco: Common objects in context," in European conference on computer vision. Springer, 2014, pp. 740-755.

"Yolo pretrained model," https://pjreddie.com/darknet/yolo/, 2022.

D. Chen, K .- T. Cho, S. Han, Z. Jin, and K. G. Shin, "Invisible sensing of vehicle steering with smartphones," in Proceedings of the 13th Annual International Conference on Mobile Systems, Applications, and Services, 2015, pp. 1-13.

R. W. Schafer, "What is a savitzky-golay filter?[lecture notes]," IEEE Signal processing magazine, vol. 28, No. 4, pp. 111-117, 2011.

M. M. Breunig, H.-P. Kriegel, R. T. Ng, and J. Sander, "Lof: identifying density-based local outliers," in Proceedings of the 2000 ACM SIGMOD international conference on Management of data, 2000, pp. 93-104.

G. Play, "Background video recorder (bvr)," https://play.google.com/store/apps/details?id=com.camera.secretvideorecorder&hl=en US&gl=US, 2022.

(56) References Cited

OTHER PUBLICATIONS

"Phyphox," https://phyphox.org/, 2022.

Sklearn, "Local outlier factor algorithm in sklearn," https://scikitlearn.org/stable/modules/generated/sklearn.neighbors.LocalOutlierFactor.html, 2022.

J. Sun, Y. Cao, Q. A. Chen, and Z. M. Mao, "Towards robust {LiDAR-based} perception in autonomous driving: General black-box adversarial sensor attack and countermeasures," in 29th USENIX Security Symposium (USENIX Security 20), 2020, pp. 877-894.

Y. Cao, C. Xiao, B. Cyr, Y. Zhou, W. Park, S. Rampazzi, Q. A. Chen, K. Fu, and Z. M. Mao, "Adversarial sensor attack on lidar-based perception in autonomous driving," in Proceedings of the 2019 ACM SIGSAC conference on computer and communications security, 2019, pp. 2267-2281.

Y. Cao, N. Wang, C. Xiao, D. Yang, J. Fang, R. Yang, Q. A. Chen, M. Liu, and B. Li, "Invisible for both camera and lidar: Security of multi-sensor fusion based perception in autonomous driving under physical-world attacks," in 2021 IEEE Symposium on Security and Privacy (SP). IEEE, 2021, pp. 176-194.

T. Sato, J. Shen, N. Wang, Y. Jia, X. Lin, and Q. A. Chen, "Dirty road can attack: Security of deep learning based automated lane centering under {Physical-World} attack," in 30th USENIX Security Symposium (USENIX Security 21), 2021, pp. 3309-3326.

X. Ji, Y. Cheng, Y. Zhang, K. Wang, C. Yan, W. Xu, and K. Fu, "Poltergeist: Acoustic adversarial machine learning against cameras and computer vision," in 2021 IEEE Symposium on Security and Privacy (SP). IEEE, 2021, pp. 160-175.

C. Yan, W. Xu, and J. Liu, "Can you trust autonomous vehicles: Contactless attacks against sensors of self-driving vehicle," Def Con, vol. 24, No. 8, p. 109, 2016.

J. Shen, J. Y. Won, Z. Chen, and Q. A. Chen, "Drift with devil: Security of {Multi-Sensor} fusion based localization in {High-Level} autonomous driving under {GPS} spoofing," in 29th USENIX Security Symposium (USENIX Security 20), 2020, pp. 931-948.

L. He, Y. Shu, Y. Lee, D. Chen, and K. G. Shin, "Authenticating drivers using automotive batteries," Proceedings of the ACM on Interactive, Mobile, Wearable and Ubiquitous Technologies, vol. 4, No. 4, pp. 1-27, 2020.

A. M. Guzman, M. Goryawala, J. Wang, A. Barreto, J. Andrian, N. Rishe, and M. Adjouadi, "Thermal imaging as a biometrics approach to facial signature authentication," IEEE journal of biomedical and health informatics, vol. 17, No. 1, pp. 214-222, 2012.

S. Hu, J. Choi, A. L. Chan, and W. R. Schwartz, "Thermal-to-visible face recognition using partial least squares," JOSA A, vol. 32, No. 3, pp. 431-442, 2015.

G. Zheng, C.-J. Wang, and T. E. Boult, "Application of projective invariants in hand geometry biometrics," IEEE transactions on Information Forensics and Security, vol. 2, No. 4, pp. 758-768, 2007.

* cited by examiner

100

200

300

DETECTION VEHICLE MOTION DATA
310

CONTINUOUSLY CAPTURE VIDEO DATA OF VEHICLE'S REAR FIELD-OF-VIEW
320

DETECT FOLLOWING VEHICLE(S) IN VIDEO DATA
330

DETERMINE VEHICLE CRITICAL DRIVING BEHAVIOR BASED ON MOTION DATA
340

DETERMINE WHETHER FOLLOWING VEHICLE(S) EXHIBIT ABNORMAL FOLLOWING BEHAVIOR
350

GENERATE ALERT
360

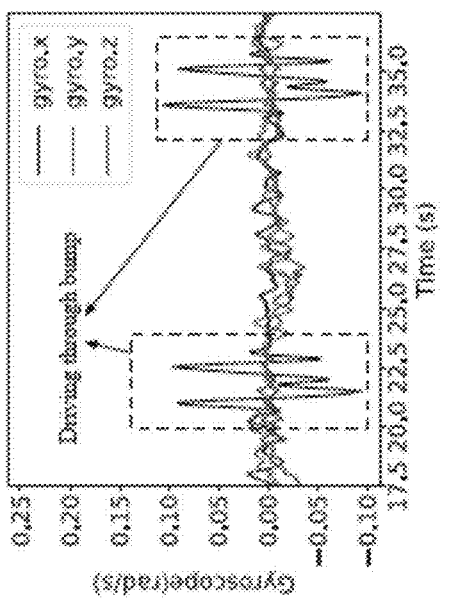
FIG. 4E
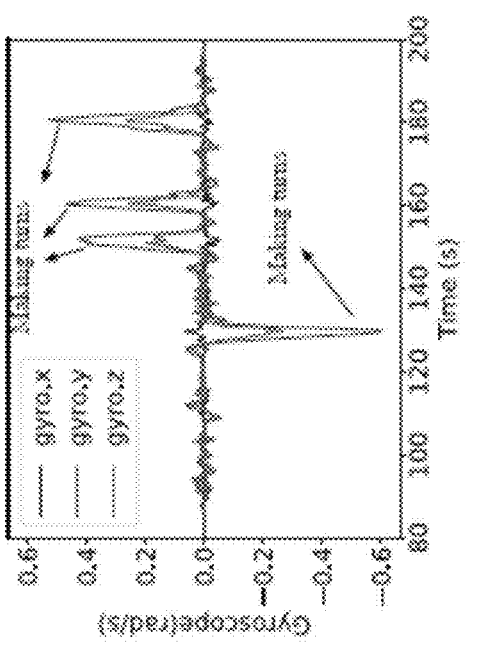
FIG. 4D
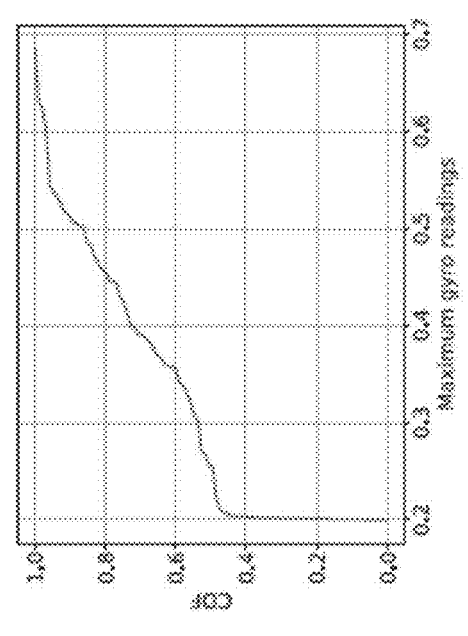
FIG. 4G
FIG. 4F

| Anomaly detection algorithm | Accuracy | Precision | Recall | F-1 Score |
| --- | --- | --- | --- | --- |
| OC-SVM | 0.58 | 1.0 | 0.52 | 0.68 |
| Isolation Forest | 0.82 | 1.0 | 0.79 | 0.88 |
| LOF | 0.95 | 0.98 | 0.97 | 0.97 |

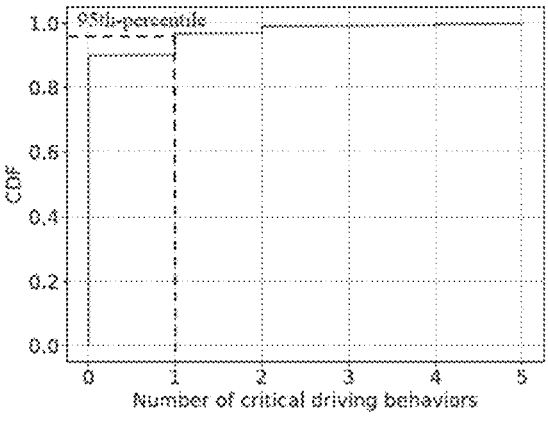
FIG. 6E
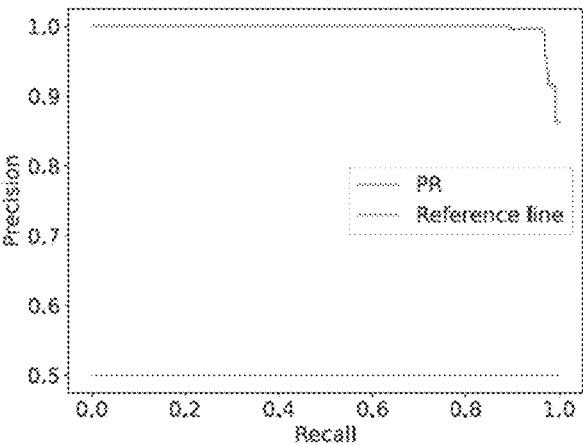
FIG. 6G
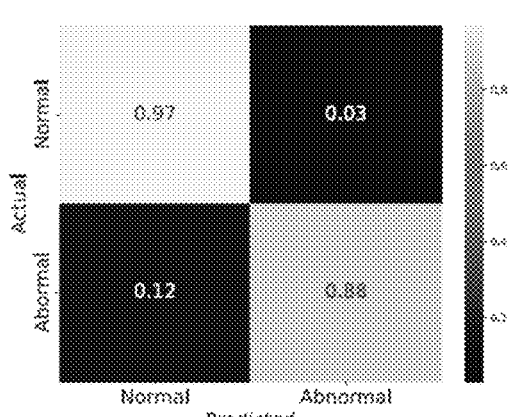
FIG. 6H
FIG. 6F

SYSTEM AND METHODS FOR DETECTING ABNORMAL FOLLOWING VEHICLES

CROSS-REFERENCE TO RELATED APPLICATIONS

This application claims priority to and the benefit of U.S. Provisional Application No. 63/486,133, titled "SYSTEM AND METHODS FOR DETECTING ABNORMAL FOLLOWING VEHICLES," filed on Feb. 21, 2023, the content of which is hereby incorporated by reference herein in its entirety.

STATEMENT REGARDING FEDERALLY SPONSORED RESEARCH OR DEVELOPMENT

This invention was made with government support under Grant Nos. 2007581, 2128567, and 2112471 awarded by the National Science Foundation. The government has certain rights in the invention.

BACKGROUND

Recent studies show that Americans spend about one hour behind the wheel of a vehicle every day. Being followed by the other vehicles while driving is not only a scary experience, but risks exposure of sensitive or private information (e.g., home address, work address, daily routines, etc.). Moreover, abnormal following behavior in other vehicles can cause significant traffic issues, such as accidents, delays, and the like, as a following vehicle needs to maintain an appropriate separation to a followed vehicle without getting lost or being detected. To improve the safety and privacy of drivers, it would be beneficial to detect abnormal following behaviors of other vehicles and, moreover, to discriminate between abnormal following vehicles (e.g., "stalking" vehicles) and other, non-threating or "normal" following vehicles.

SUMMARY

Embodiments of the present disclosure provide an infrastructure-free system that can detect abnormal following vehicles during driving. To uncover or detect the abnormal following vehicles during driving, simply comparing the driving trajectory of the following vehicles and a target vehicle will introduce high false positive and false negative detection. This is because the abnormal following vehicle may not have the same driving trajectory as a target vehicle. The abnormal following vehicles can simply follow the primary vehicle anywhere and in any manner. Furthermore, normal following vehicles may simply have the same driving trajectory as the target vehicle due to the single-track road or same driving destination.

Embodiments of the present disclosure provide systems and methods that can detect abnormal following vehicles, for example, using sensor fusion operations. In some implementations, an imaging sensor, such as a camera, is used to extract a following vehicle's following time, and additional sensors (e.g., Inertial Measurement Unit (IMU) sensor(s), Gyroscope) are used to obtain data that can be used to determine a primary vehicle's critical driving behavior (e.g., making a left or right turn). The space diversity of IMU sensing data can be used to remove road surface condition artifacts (e.g., bumps on the road surface) from critical driving behavior (CDB) detection. In some implementations, machine learning-based anomaly detection algorithms are leveraged to detect the abnormal following vehicles based on the following vehicle's following time and the primary vehicle's critical driving behavior within the following time.

In some implementations, a system for detecting abnormal following vehicles is provided. The system can include: at least one sensor configured to detect motion data of a first vehicle; a camera positioned within the first vehicle such that a field-of-view (FOV) of the camera faces outward from a rear of the first vehicle; a processor; memory having instructions stored thereon that, when executed by the processor, cause the system to: continuously capture video data of the camera's FOV; detect following vehicles in the captured video data using an object detection model; determine an amount of time that each of the following vehicles follows the first vehicle; determine critical driving behavior of the first vehicle based on the detected motion data; and determine whether one or more of the following vehicles is exhibiting abnormal following behavior with respect to the first vehicle based on the amount of time that each of the following vehicles follows the first vehicle and the critical driving behavior of the first vehicle.

In some implementations, the at least one sensor includes an inertial measurement unit (IMU).

In some implementations, the at least one sensor, camera, processor, and memory are components of a smartphone.

In some implementations, one or more of the at least one sensor, camera, processor, and memory are components of a vehicle computer.

In some implementations, the object detection model is a deep convolution neural network.

In some implementations, the object detection model is a You Only Look Once (YOLO) algorithm.

In some implementations, the amount of time ($T_{ID}$) that each of the following vehicles follows the first vehicle is calculated as:

$$T_{ID} = \frac{N_L - N_F}{f_r}$$

where $f_r$ denotes a frame rate of the camera, $N_F$ denotes a time that the respective following vehicle was first detected in the video data, and $N_L$ denotes a time that the respective following vehicle is no longer detected in the video data.

In some implementations, the instructions further cause the system to filter noise from the motion data prior to determining the critical driving behavior of the first vehicle.

In some implementations, the noise is filtered from the motion data using a Savitzky-Golay filter.

In some implementations, to determine whether one or more of the following vehicles is exhibiting abnormal following behavior with respect to the first vehicle based on the amount of time that each of the following vehicles follows the first vehicle and the critical driving behavior of the first vehicle, the instructions cause the system to: determine an anomaly score for each of the following vehicles based on the critical driving behavior of the first vehicle within respective amounts of time that each of the following vehicles were following the first vehicle.

In some implementations, the anomaly scores are determined using a Local Outlier Factor (LOF) algorithm.

In some implementations, the instructions further cause the system to alert an operator of the first vehicle if one or more of the following vehicles is determined to exhibit abnormal following behavior.

In some implementations, the system further includes a user interface, wherein the alert includes one or both of an audio or a visual alert presented via the user interface.

In some implementations, the alert includes driving instructions or directions to a designated safe location.

In some implementations, a method for detecting abnormal following vehicles is provided. The method can include: obtaining motion data for a first vehicle via at least one sensor; continuously capturing video data of a rear FOV of the first vehicle via a second sensor; detecting one or more following vehicles in the captured video data using an object detection model; determining an amount of time that each of the following vehicles follows the first vehicle; determining critical driving behavior of the first vehicle based on the motion data; and determining whether one or more of the following vehicles is exhibiting abnormal following behavior with respect to the first vehicle based on the amount of time that each of the following vehicles follows the first vehicle and the critical driving behavior of the first vehicle.

In some implementations, the method further includes: synchronizing the motion data and the captured video data based on detected time variations.

In some implementations, the object detection model includes at least one of a deep convolution neural network or a YOLO algorithm.

In some implementations, the method further includes: filtering noise from the motion data prior to determining the critical driving behavior of the first vehicle.

In some implementations, filtering noise includes removing road condition artifacts from the motion data across at least one coordinate system axis.

In some implementations, the method further includes: generating an alert if one or more of the following vehicles is determined to exhibit abnormal following behavior.

Additional advantages of the disclosed systems and methods will be set forth in part in the description that follows and in part will be obvious from the description.

The advantages of the disclosed compositions and methods will be realized and attained by means of the elements and combinations particularly pointed out in the appended claims. It is to be understood that both the foregoing general description and the following detailed description are exemplary and explanatory only and is not restrictive of the disclosed compositions and methods, as claimed.

The details of one or more embodiments of the present disclosure are set forth in the accompanying drawings and the description below. Other features, objects, and advantages of the present disclosure will be apparent from the description and drawings and from the claims.

Throughout the description and claims of this specification, the word "comprise" and other forms of the word, such as "comprising" and "comprises," means including but not limited to, and is not intended to exclude, for example, other additives, components, integers, or steps.

BRIEF DESCRIPTION OF THE DRAWINGS

FIG. 4D is a graph showing gyroscope readings over time when the driver makes turns while driving on a smooth road.

FIG. 4E is a graph showing gyroscope readings when a test vehicle was driven over two bumps on the road surface without making any turns.

FIG. 4F shows the cumulative distribution function (CDF) of the maximum gyroscope reading when the test vehicle makes turns.

FIG. 4G is a map showing the driving path in the local area during data collection.

FIG. 6E is a graph showing the CDF of the number of critical driving behaviors within the normal following vehicle's following time period.

FIG. 6F is a graph showing a receiver operating characteristic (ROC) curve of the proposed anomaly detection algorithm.

FIG. 6G is a graph showing a precision-recall (PR) curve of the proposed anomaly detection algorithm.

FIG. 6H shows a normalized confusion matrix corresponding with the proposed anomaly detection algorithm.

Figure 1:
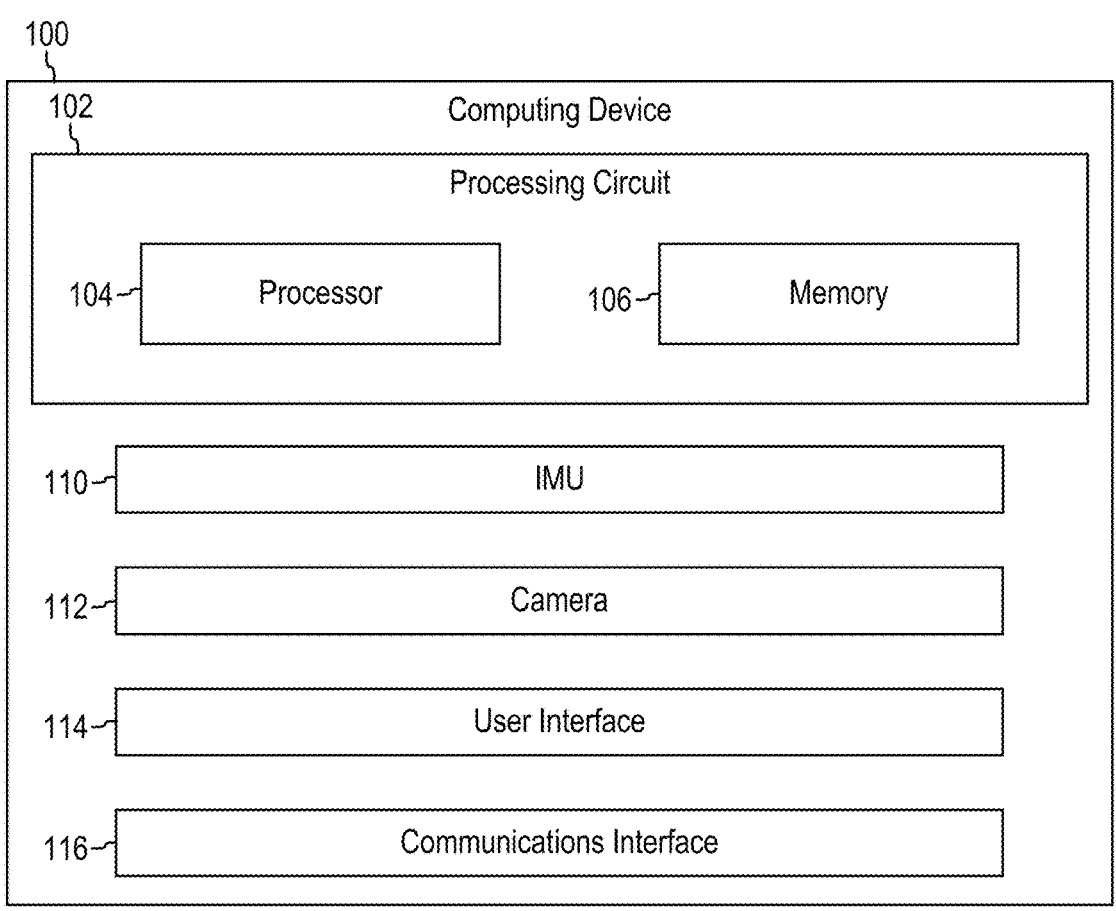
FIG. 1 is a block diagram of an example computing device for implementing the processes described herein, according to some implementations.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Disclosed herein are systems and methods for detecting abnormal following vehicles or "stalking" vehicles. In some implementations, the disclosed systems and methods are embodied as a Privacy-Preserving Defensive Driving system (P2D2) that detects abnormal following vehicles with a user's smartphone or other personal computing device. An "abnormal following vehicle" is generally any vehicle (e.g., car, truck, etc.) that follows a target vehicle or primary vehicle (e.g., a vehicle being operated by a user of P2D2) for a long period of time or, more specifically, for longer than a threshold amount of time. Intuitively, the longer a following vehicle follows a target vehicle, the higher the probability the following vehicle is stalking or otherwise engaging in abnormal following behavior. Further, abnormal following vehicles, by definition, will follow a similar pattern of turns and stops as the target vehicle.

As mentioned, the system and methods described herein can be implemented by a smartphone or other personal computing device within a vehicle (herein collectively referred to as smartphones). Generally, smartphones include a camera or can be coupled to another imaging device (e.g., a camera, a webcam, etc.). A user's smartphone may implement the disclosed methods to extract a following time of all the following vehicles within the field-of-view (FOV) of the camera. In addition, sensors within the smartphone can sense the target vehicle's critical driving behavior (CDB). These sensors can include, for example, an inertial measurement unit (IMU) or gyroscope. Since certain sensor readings (e.g., gyroscope readings) are the result of forces introduced by the driver's control as well as the road's horizontal and vertical geometry (e.g., bumpy road), artifacts of road surface conditions may need to be removed or filtered from data readings. Therefore, a road condition artifact removal approach is proposed for accurate critical driving behavior detection by harnessing IMU sensing data across the x-axis, y-axis, and z-axis. After extracting the following vehicle's following time and the target vehicle's critical driving behavior within the following vehicles' following time, a machine learning-based anomaly detection algorithm is proposed to detect the abnormal following vehicles with sensor fusion. Specifically, Local Outlier Factor (LOF) is leveraged for anomaly detection, which can measure the local deviation of the density of a given sample in comparison to its neighbors and has demonstrated superiority over various other anomaly detection algorithms (e.g., One-class Support Vector Machine (OC-SVM) and Isolation Forest algorithms).

After extracting a following vehicle's following time and the target vehicle's CDB within the following vehicles' following time, a machine learning based anomaly detection algorithm is implemented to detect abnormal following vehicles. In some implementations, Local Outlier Factor (LOF) is leveraged for anomaly detection, which can measure the local deviation of the density of a given sample in comparison to its neighbors. LOF has demonstrated superiority over certain other anomaly detection algorithms (e.g., OC-SVM and Isolation forest algorithms); although, it should be appreciated that other suitable anomaly detection models can be used. When an abnormal following vehicle is detected, the driver of the target vehicle can be alert, which gives the driver an opportunity to, for example, make a detour and drive to the public place (e.g., police station). By adjusting their route, the target vehicle driver's actions may further confirm whether a following vehicle is exhibiting abnormal following behavior. For example, if the vehicle continues to follow the target vehicle, suspicions that the following vehicle is exhibiting abnormal following behavior may be validated.

To the inventors' knowledge, this is the first privacy-preserving defensive driving system that can detect abnormal following vehicles during driving (i.e., in real-time) using a sensor fusion approach. A road condition artifact removal approach is employed by harnessing IMU sensing data across the x-axis, y-axis, and z-axis for accurate critical driving behavior detection. Experimental results demonstrate the efficiency of the proposed system in detecting the abnormal following vehicles for privacy-preserving driving.

Example Computing Device

Referring now to FIG. 1, an example computing device 100 is shown which can implement the processes and methods described herein. In some implementations, computing device 100 is a smartphone; although, it should be appreciated that computing device 100 can be any personal computing device or custom computing device. Accordingly, it should be understood that computing device 100 is not limited to only those components illustrated in FIG. 1; rather, computing device 100 may include any components (e.g., sensors) that are typically found in a smartphone or other, similar personal computing device. In some implementations, computing device 100 is a component of a vehicle (e.g., a car or truck). For example, computing device 100 may be a computer that is integrated into a vehicle. It should also be appreciated that the functionality of computing device 100, as described herein, can be implemented by more than one physical computing device. For example, computing device 100 may comprise components of both a vehicle computer and a smartphone.

Computing device 100 may be generally configured to implement or execute the various processes and methods described herein. Computing device 100 generally includes a processing circuit 102 that includes a processor 104 and a memory 106. Processor 104 can be a general-purpose processor, an ASIC, one or more FPGAs, a group of processing components, or other suitable electronic processing structures. In some embodiments, processor 104 is configured to execute program code stored on memory 106 to cause computing device 100 to perform one or more operations, as described below in greater detail. It will be appreciated that, in embodiments where computing device 100 is part of another computing device (e.g., a general purpose computer), the components of computing device 100 may be shared with, or the same as, the host device.

Memory 106 can include one or more devices (e.g., memory units, memory devices, storage devices, etc.) for storing data and/or computer code for completing and/or facilitating the various processes described in the present disclosure. In some embodiments, memory 106 includes tangible (e.g., non-transitory), computer-readable media that stores code or instructions executable by processor 104. Tangible, computer-readable media refers to any physical media that is capable of providing data that causes computing device 100 to operate in a particular fashion. Example tangible, computer-readable media may include, but is not limited to, volatile media, non-volatile media, removable media and non-removable media implemented in any method or technology for storage of information such as computer readable instructions, data structures, program modules or other data. Accordingly, memory 106 can include RAM, ROM, hard drive storage, temporary storage, non-volatile memory, flash memory, optical memory, or any other suitable memory for storing software objects and/or computer instructions. Memory 106 can include database components, object code components, script components, or any other type of information structure for supporting the various activities and information structures described in the present disclosure. Memory 106 can be communicably connected to processor 104, such as via processing circuit 102, and can include computer code for executing (e.g., by processor 104) one or more processes described herein.

While shown as individual components, it will be appreciated that processor 104 and/or memory 106 can be implemented using a variety of different types and quantities of processors and memory. For example, processor 104 may represent a single processing device or multiple processing devices. Similarly, memory 106 may represent a single memory device or multiple memory devices. Additionally, in some embodiments, computing device 100 may be implemented within a single computing device (e.g., one server, one housing, etc.). In other embodiments, computing device 100 may be distributed across multiple servers or computers (e.g., that can exist in distributed locations). For example, computing device 100 may include multiple distributed computing devices (e.g., multiple processors and/or memory devices) in communication with each other that collaborate to perform operations. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. For example, virtualization software may be employed by computing device 100 to provide the functionality of a number of servers that is not directly bound to the number of computers in computing device 100.

Computing device 100 is shown to further include an inertial measurement unit (IMU) 110. IMU 110 generally includes one or more sensors for measuring angular rate, specific force/acceleration, and optionally a magnetic field of a device. Put another way, IMU 110 can measure motion of computing device 100. In some implementations, IMU 110 includes one or more of gyroscopes, accelerometers, and magnetometers. In some implementations, IMU 110 is configured to measure x-axis, y-axis, and z-axis positioning and motion of computing device 100. Computing device 100 is also shown to include a camera 112. Camera 112 may be any image capture device that can capture still images and/or record video. In some implementations, camera 112 is an embedded smartphone camera. Generally, camera 112 has a field-of-view (FOV) defined as the area across which camera 112 can image. Alternatively, the FOV may be thought of as the area that camera 112 can capture in a frame.

In some implementations, computing device 100 includes a user interface 114 to facilitate user interaction with computing device 100. User interface 114 may include a display screen and/or user input devices. For example, user interface 114 may include an LED or LCD display screen for displaying data, images, graphics, and the like. In addition, in some implementations, user interface 114 includes a user input device such as a keyboard, a joystick, buttons, a mouse, etc. In some implementations, user interface 114 is a touchscreen. In some implementations, user interface 114 can display alerts to a user. Said alerts may be audio and/or visual alerts, such as noises, speech, videos, lights, graphics, and the like.

Computing device 100 is also shown to include a communications interface 116 that facilitates communications between computing device 100 and any external components or devices. Accordingly, communications interface 116 can be or can include a wired or wireless communications interface (e.g., jacks, antennas, transmitters, receivers, transceivers, wire terminals, etc.) for conducting data communications, or a combination of wired and wireless communication interfaces. In some embodiments, communications via communications interface 116 are direct (e.g., local wired or wireless communications) or via a network (e.g., a WAN, the Internet, a cellular network, etc.). For example, communications interface 116 may include one or more Ethernet ports for communicably coupling computing device 100 to a network (e.g., the Internet). In another example, communications interface 116 can include a Wi-Fi transceiver for communicating via a wireless communications network. In yet another example, communications interface 116 may include cellular or mobile phone communications transceivers.

In some implementations, IMU 110 and/or camera 112 are components of a first computing device, while one or more of processing circuit 102, user interface 114, and communications interface 116 are components of a second computing device. For example, IMU 110 and/or camera 112 may be components of a user's smartphone while processing circuit 102 and user interface 114 are components of a vehicle (e.g., a vehicle computer and infotainment system). In some such implementations, data from IMU 110 and/or camera 112 may be transmitted to a remote device (e.g., a vehicle computer) for processing and/or display. In some implementations, computing device 100 captures data from IMU 110, camera 112, and/or one or more additional sensors and transmits the data to a remote device (e.g., a vehicle computer) for processing and/or display. Therefore, it should be understood that the description of computing device 100 and the functions thereof are not limited to a single computing device.

Example System

Figure 2:
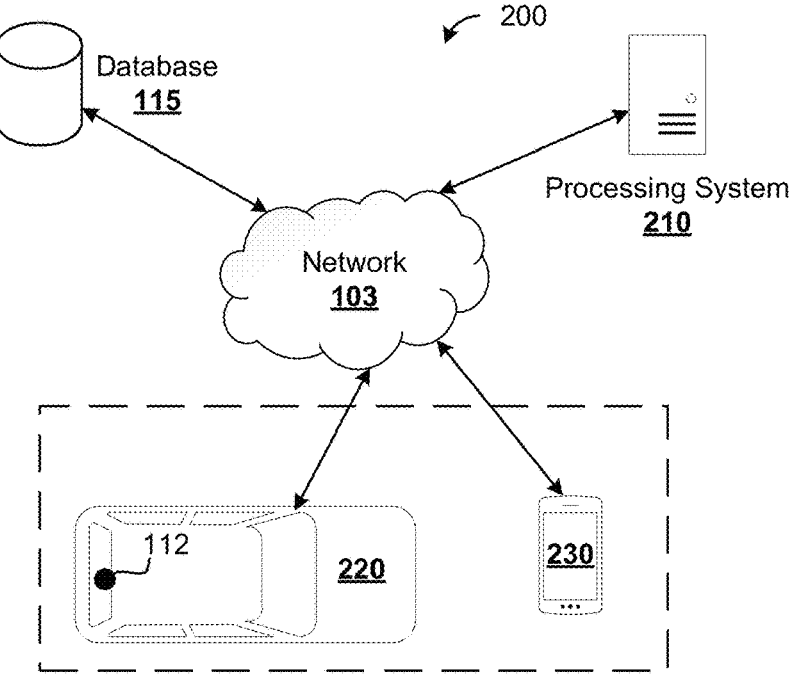
FIG. 2 is an example system in accordance with certain embodiments of the present disclosure.

FIG. 2 is an example system 200 in accordance with certain embodiments of the present disclosure. As shown in FIG. 2, the system 200 includes a processing system 210 configured to communicate with vehicle 220 and/or computing device 230 (e.g., smartphone, mobile device). In various implementations, the processing system 210 and vehicle 220 and/or computing device 230 are configured to transmit data to and receive data from one another over a network 103. The system 200 can include one or more databases, data stores, repositories, and the like. As shown, the system 200 includes database(s) 115 in communication with the vehicle 220, computing device 230 and the processing system 210. In some implementations, the database(s) 115 can be hosted by the processing system 210.

In some implementations, the vehicle 220 and/or computing device 230 each comprise at least one sensor that can be used to obtain data from the vehicle's surroundings and image data associated with following vehicles. The at least one sensor can comprise an inertial measurement unit (IMU), optical devices, image sensors (e.g., cameras), location sensors (such as a global positioning system (GPS) sensor), two dimensional (2D) and/or three dimensional (3D) light detection and ranging (LiDAR) sensor(s), long, medium, and/or short range radio detection and ranging (RADAR) sensor(s), ultrasonic sensors, electromagnetic sensors, (near-) infrared (IR) cameras, 3D cameras, 360° cameras, accelerometer(s), gyroscope(s), and/or other sensors that facilitate determining one or more features of the corresponding surroundings, and/or other components configured to perform various operations, procedures, functions or the like described herein.

By way of example, the vehicle 220 and/or computing device 230 can each be configured to identify abnormal following vehicles, transmit indications of the detected following vehicles, and or generate alerts. In some implementations, a given vehicle 220 or computing device 230 can transmit such information to a server (e.g., processing system 210) where it may be stored in a database 115 for subsequent analysis and/or used to generate and send indications to other vehicles in communication therewith, for example, as part of a navigation or vehicle safety monitoring system or service.

Example Method

Figure 3:
FIG. 3 is a flowchart diagram depicting a method for detecting abnormal following vehicles in accordance with certain implementations described herein.

Referring now to FIG. 3, a flowchart diagram depicting a method 300 for detecting abnormal following vehicles in accordance with certain implementations described herein is shown. This disclosure contemplates that the example method 300 can be performed using one or more computing devices (e.g., the computing device 100 illustrated in FIG. 1).

At step/operation 310, the method 300 includes detecting motion data for a target vehicle (e.g., primary vehicle) via at least one sensor. The at least one sensor can be a component of the target vehicle or smartphone (e.g., IMU, camera, and/or the like).

At step/operation 320, the method 300 includes continuously capturing (e.g., monitoring) video data of the target vehicle's rear field-of-view, for example, via a vehicle camera or smartphone camera. In some implementations, the method 300 includes performing a sensor fusion operation, for example, synchronizing the motion data and the captured video data based, at least in part, on detected time variations.

At step/operation 330, the method 300 includes detecting one or more following vehicles in the video data, for example, using an object detection model. In some implementations, the object detection model is a deep convolutional neural network or a You Only Look Once (YOLO) algorithm. In some implementations, the method 300 includes determining an amount of time that each following vehicle(s) spends following the target vehicle. For example, the amount of time ($T_{ID}$) that each of the following vehicles follows the first vehicle can be determined based on the following formula:

$$T_{ID} = \frac{N_L - N_F}{f_r}$$

In the above formula, $f_r$ denotes a frame rate of the camera, $N_F$ denotes a time that the respective following vehicle was first detected in the video data, and $N_L$ denotes a time that the respective following vehicle is no longer detected in the video data.

At step/operation 340, the method 300 includes determining critical driving behavior for the target vehicle based, at least in part, on the detected motion data. In some implementations, the method 300 includes filtering noise from the motion data prior to determining the critical driving behavior for the target vehicle, for example, using a Savitzky-Golay filter. A Savitzky-Golay filter is a convolution-based digital filter that can be applied to a digital data set in order to smooth out the data and can increase data precision without distorting the underlying data. In some examples, the method 300 includes removing road condition artifacts from the motion data across at least one coordinate system axis (e.g., the x-axis from the Cartesian coordinate system). As described in more detail herein, gyroscope data from certain axes (e.g., x-axis) may be more closely associated with road condition artifacts, while gyroscope data from other axes (e.g., y-axis, z-axis) may be more closely associated with a vehicle's motion.

At step/operation 350, the method 300 includes determining whether the one or more following vehicles exhibit abnormal following behavior with respect to the target vehicle. In some implementations, the method 300 includes determining an anomaly score for each of the following vehicles based on the critical driving behavior of the first vehicle within respective amounts of time that each of the following vehicles were following the target vehicle. In some embodiments, the method 300 includes determining the anomaly scores using a Local Outlier Factor (LOF) algorithm. In some examples, the alert includes driving instructions or directions to a designated safe location.

At step/operation 360, the method 300 includes generating an alert. For example, the method 300 can include generating an audio and/or visual alert on a vehicle or smartphone user interface to alert the operator of the target vehicle that one or more of the following vehicles is exhibiting abnormal following behavior. In some examples, an alert can be sent to another registered device (e.g., another smartphone) or to a central server associated with a vehicle monitoring service.

Artificial Intelligence and Machine Learning

Embodiments of the present disclosure include applying machine learning models, algorithms, and/or techniques (terms used interchangeably herein) to, for example, determine a vehicle's critical driving behavior, to identify/detect following vehicles, and/or determine an anomaly score for a following vehicle.

The term "artificial intelligence" is defined herein to include any technique that enables one or more computing devices or comping systems (i.e., a machine) to mimic human intelligence. Artificial intelligence (AI) includes, but is not limited to, knowledge bases, machine learning, representation learning, and deep learning. The term "machine learning" is defined herein to be a subset of AI that enables a machine to acquire knowledge by extracting patterns from raw data. Machine learning techniques include, but are not limited to, logistic regression, support vector machines (SVMs), decision trees, Naïve Bayes classifiers, and artificial neural networks. The term "representation learning" is defined herein to be a subset of machine learning that enables a machine to automatically discover representations needed for feature detection, prediction, or classification from raw data. Representation learning techniques include, but are not limited to, autoencoders. The term "deep learning" is defined herein to be a subset of machine learning that enables a machine to automatically discover representations needed for feature detection, prediction, classification, etc. using layers of processing. Deep learning techniques include, but are not limited to, artificial neural network or multilayer perceptron (MLP).

Machine learning models include supervised, semi-supervised, and unsupervised learning models. In a supervised learning model, the model learns a function that maps an input (also known as feature or features) to an output (also known as target or targets) during training with a labeled data set (or dataset). In an unsupervised learning model, the model learns patterns (e.g., structure, distribution, etc.) within an unlabeled data set. In a semi-supervised model, the model learns a function that maps an input (also known as feature or features) to an output (also known as target or target) during training with both labeled and unlabeled data.

Artificial Neural Networks

An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can be arranged in a plurality of layers such as input layer, output layer, and optionally one or more hidden layers. An ANN having hidden layers can be referred to as deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tanH, or rectified linear unit (ReLU) function), and provide an output in accordance with the activation function. Additionally, each node is associated with a respective weight. ANNs are trained with a dataset to maximize or minimize an objective function. In some implementations, the objective function is a cost function, which is a measure of the ANN's performance (e.g., error such as L1 or L2 loss) during training, and the training algorithm tunes the node weights and/or bias to minimize the cost function. This disclosure contemplates that any algorithm that finds the maximum or minimum of the objective function can be used for training the ANN. Training algorithms for ANNs include, but are not limited to, backpropagation. It should be understood that an artificial neural network is provided only as an example machine learning model. This disclosure contemplates that the machine learning model can be any supervised learning model, semi-supervised learning model, or unsupervised learning model. Optionally, the machine learning model is a deep learning model. Machine learning models are known in the art and are therefore not described in further detail herein.

A convolutional neural network (CNN) is a type of deep neural network that has been applied, for example, to image analysis applications. Unlike a traditional neural networks, each layer in a CNN has a plurality of nodes arranged in three dimensions (width, height, depth). CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by downsampling). A fully-connected layer includes neurons, where each neuron is connected to all of the neurons in the previous layer. The layers are stacked similar to traditional neural networks.

An anomaly detection algorithm refers to data analysis and/or machine learning techniques for identifying instances that deviate from expected behavior, trends, and/or norms within a dataset. These anomalies, also known as outliers, may differ from a majority of data points and may be indicative of errors or events of interest. Anomaly detection techniques and algorithms can include statistical methods as well as supervised or unsupervised machine learning techniques. Exemplary machine learning techniques can include k-nearest neighbors, k-means clustering, Isolation Forests, Density-Based Spatial Clustering of Applications with Noise (DBSCAN), Random Forests, Support Vector Machines, Neural Networks, Local Outlier Factor (LOF), and deep learning techniques (e.g., autoencoders, recurrent neural networks (RNNs), and the like).

An object detection model refers to computer vision models used in various applications, such as, but not limited to, autonomous vehicle, tracking, and augmented reality systems. Object detection models are capable of locating or identifying objects in image data (e.g., images or video) and can be used to provide specific information about objects including their location. An exemplary object detection model can extract features from input image data using CNNs or other machine learning models that are indicative of characteristics of the object in the image data. Exemplary models include one-stage detectors (e.g., You Only Look Once (YOLO) and Single Shot MultiBox Detector (SSD)) and two-stage detectors configured to propose and classify regions of interest (RoIs) in an image (e.g., Faster R-CNN and R-FCN).

Experimental Results

Various studies were conducted to evaluate the exemplary systems and methods described herein.

P2D2 Design: To track the following vehicles, a camera was used to monitor the following vehicles at the rear view of a target vehicle. The aim was to identify and track each following vehicle and further estimate each following vehicle's following time, which will be an important feature for abnormal following vehicle detection.

Following Vehicle Tracking and Identification: To track and identify the following vehicles, the You Only Look Once (YOLO) algorithm [13] was used, which can provide real-time object detection and identification in videos, images, and live feeds with high speed and accuracy. Its superiority has been demonstrated in various real-world applications such as autonomous driving [14], wildlife monitoring and detection [15], human identification with camera systems [16].

Specifically, the YOLO algorithm uses a deep convolutional neural network to provide real-time object detection and recognition [13], which mainly consists of residual boxes, bounding box regression, and intersection over union for real-time object detection and recognition. The residual boxes are used to detect the object in the gridded cells of the image, which is experimentally proven to have a good performance on object recognition. The bounding box regression is used to highlight the outline of the detected object in the image. To have the perfect surrounding outline for each object, the intersection over the union is used.

Following Time Estimation: The YOLO model for vehicle identification is trained on Microsoft's Common Objects in Context (COCO) dataset [17], which is a large-scale object detection, segmentation, and captioning dataset that has been widely used in computer vision for object detection. The pre-trained YOLO model [18] was used to track and identify the following vehicles. As a result, each following vehicle's following time is estimated, which is defined as the time duration the following vehicle appears in the rear view of the target vehicle. Specifically, each following vehicle's following time can be calculated as follows:

$$T_{ID} = \frac{N_L - N_F}{f_r} \qquad (1)$$

where $f_r$ denotes the frame rate, $N_L$ denotes the index of the frame the following vehicle has disappeared in the rear view of the target vehicle, and $N_F$ denotes the index of the frame the following vehicle has first appeared in the rear view of the target vehicle.

After obtaining each following vehicle's following time, it can be inferred that the vehicles that are following the target vehicle for a long period of time are stalking the target vehicle. However, if the following time alone is used to detect the abnormal following vehicles, there may be high false positive detections. This is because the normal following vehicle may simply have the same driving path as a target vehicle due to the same driving destination. To further enhance the detection system, the vehicle's driving behavior needs to be accounted for. Intuitively, if a target vehicle makes a left/right turn and the following vehicles do the same, it may be inferred that the following vehicles are stalking the target vehicle. Methods for detecting a driver's driving behavior with IMU sensors are described in more detail below.

Critical Driving Behavior Detection

One fact about the abnormal following vehicles is that they will follow a target vehicle no matter where and how the target vehicle drives. Within the following vehicle's following time, if the target vehicle makes more left/right turns, this may indicate that the following vehicle is abnormally following the target vehicle. So, it is important to characterize the target vehicle's driving behavior within the following time for abnormal following vehicle detection. To this end, the critical driving behavior (i.e., making left/right turns) of the target vehicle is determined (e.g., defined) and used to detect abnormal following vehicles together with the following time.

In studies that were conducted, IMU sensors (e.g., gyroscopes, accelerometers, combinations thereof) are used to sense a target vehicle's critical driving behavior. The gyroscope sensor can detect the driver's left/right turns. IMU sensors for driving behavior detection is described in Reference [19]. However, the described methods cannot be directly applied to the instant problem for two reasons. First of all, we do not need to differentiate the different driving behaviors for anomaly detection, which is computationally complex due to the time-series data comparison. Instead, a number of the target vehicle's critical driving behaviors are estimated within the following vehicle's following time. Furthermore, the prior work on driving behavior detection is not practical, since it does not consider the impact of road surface conditions on driving behavior detection. The bumps or potholes on the road surface will pollute the gyroscope readings resulting in inaccurate detection.

To this end, the artifacts of road surface conditions were removed from the vehicle's critical driving behavior detection operations by analyzing the gyroscope readings across different dimensions. Specifically, when a vehicle traverses a bumpy road, this mainly affects the gyroscope readings over the x-axis. However, when the driver makes left/right turns, it will mainly affect the gyroscope readings over the y and z axes. Therefore, the effect of the road surface condition can be eliminated by leveraging the gyroscope readings across the different axes. This is feasible since critical driving behaviors can be detected without discriminating against them.

To demonstrate this, a study was conducted in which a test vehicle was driven on a smooth road and made turns while driving. Instead of plotting the raw gyroscope readings over time, random noise was first filtered out to eliminate the effect of the vehicle's vibration and the drift of gyroscope readings. A Savitzky-Golay filter with a window size of 101 and polynomial order of 3 was employed for the noise filtering, as it can achieve good performance empirically [20].

Figures 4A, 4B, 4C:
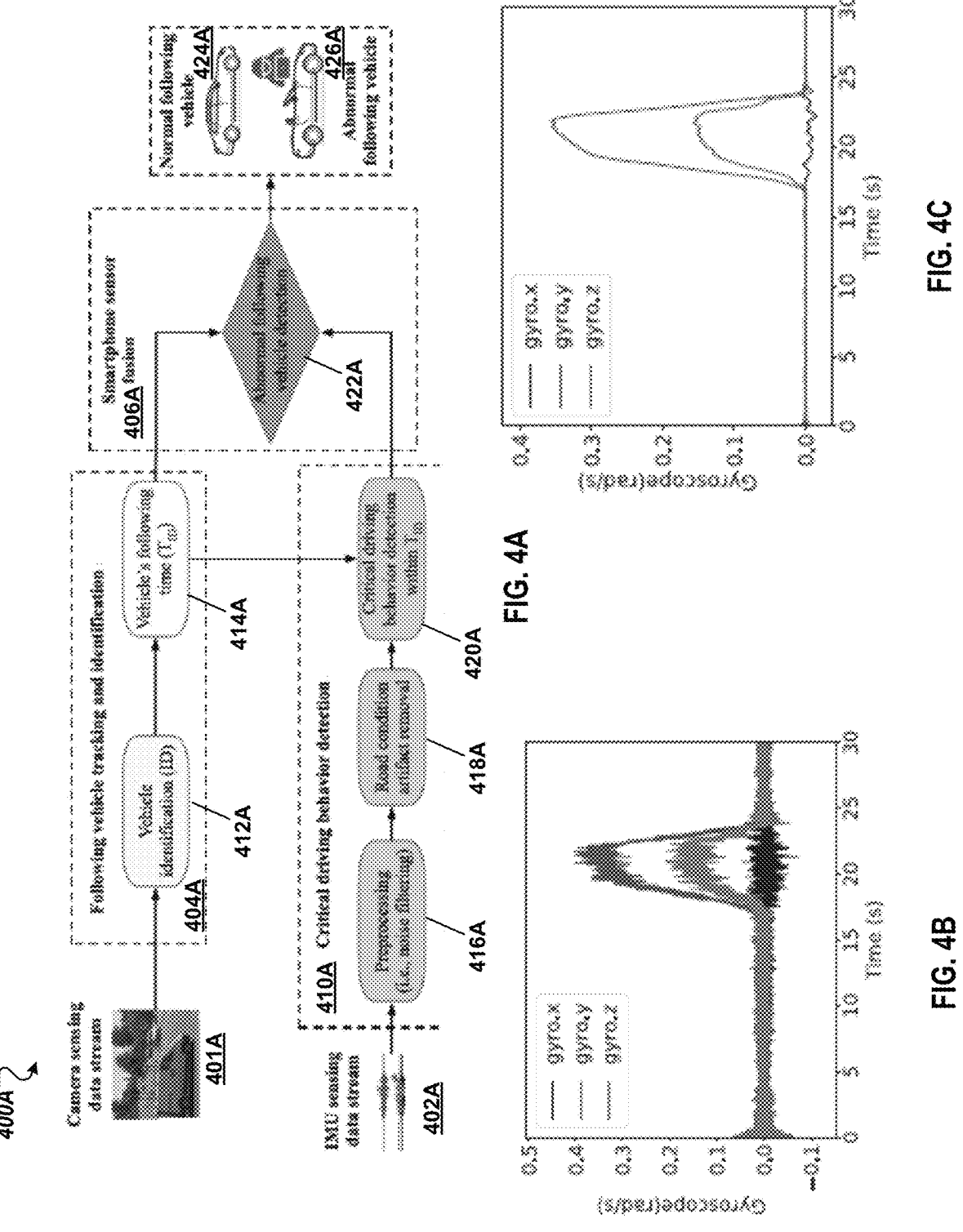
FIG. 4A is a schematic diagram depicting a workflow of Privacy-Preserving Defensive Driving system (P2D2) for abnormal following vehicle detection in accordance with certain implementations described herein.
FIG. 4B is a graph depicting raw gyroscope readings over time without noise filtering.
FIG. 4C is a graph depicting the gyroscope readings over time from FIG. 4B after filtering out the noise.

FIG. 4A is a schematic diagram depicting a workflow/method 400A of P2D2 for abnormal following vehicle detection with the sensor fusion based on the following vehicle's following time and the target vehicle's critical driving behavior within the following time. The method 400A includes obtaining (e.g., accessing) a first data stream 401A and a second data stream 402A. In the example shown in FIG. 4A, the first data stream 401A is a camera sensing data stream and the second data stream 402A is an IMU sensing data stream. The P2D2 system includes a following vehicle tracking and identification component 404A, a smartphone sensor fusion component 406A, and a critical driving behavior detection component 410A. It should be understood that each of the above components can be embodied as a processor/circuitry in a smartphone, vehicle (e.g., vehicle computer), remote server, or combinations thereof.

The following vehicle tracking and identification component 404A is configured to determine a vehicle identification (ID) 412A and following time 414A for detected following vehicles. The critical driving behavior detection component 410A is configured to process the second data stream 402A. As shown, the critical driving behavior detection component 410A performs a preprocessing operation 416A (e.g., noise filtering) and road condition artifact removal operation 418A on the second data stream 402A to determine critical driving behavior 420A for a target vehicle (e.g., primary vehicle) within the following time 414A. FIG. 4B is a graph depicting raw gyroscope readings over time without noise filtering, as a test vehicle was driven while making a left turn. FIG. 4C is a graph depicting the gyroscope readings over time from FIG. 4B after filtering out the noise. As shown, after applying the Savitzky-Golay filter, the gyroscope readings are smooth over time. Accordingly, FIG. 4B and FIG. 4C that the noise-filtering step/operation makes the proposed critical driving behavior detection more robust.

Subsequently, the smartphone sensor fusion component 406A uses the following time 414A and critical driving behavior 420A for abnormal following vehicle detection operations 422A in order to distinguish between normal following vehicles 424A and abnormal following vehicles 426A.

The impact of road surface conditions on gyroscope readings for critical driving behavior detection was explored in conducted studies. FIG. 4D is a graph showing gyroscope readings over time when the driver makes turns while driving on a smooth road. As shown in FIG. 4D, there is significant variation of gyroscope readings across the y-axis and z-axis, when the vehicle makes turns. However, the gyroscope readings across the x-axis are stable due to the smooth road surface. Comparably, in another study, the test vehicle was driven over two bumps on the road surface without making any turns. FIG. 4E is a graph showing corresponding gyroscope readings over time. As shown in FIG. 4E, the gyroscope readings over the x-axis vary significantly when the vehicle is driven through the bumps. However, the gyroscope readings over the y-axis and z-axis are quite stable. So, analysis of the variation of gyroscope readings over the y-axis or z-axis can be used to inform and/or detect critical driving behaviors. Since we do not need to discriminate each specific driving behavior, measurement of the variation of the gyroscope readings over the y-axis or z-axis is proposed herein for critical driving behavior detection. To do so, a variation threshold is empirically set to construct a hypothesis test for this sake. FIG. 4F shows the cumulative distribution function (CDF) of the maximum gyroscope reading when the test vehicle makes turns. As shown, the maximum gyroscope readings take the value from the range of [0.2, 0.7], which depends on the significance of turns. In our experiments, the threshold was set to 0.16 for critical driving behavior detection.

So far, this disclosure has described methods for extracting the following time of each following vehicle and the critical driving behavior of the target vehicle within the following time, which can be leveraged to detect the abnormal following vehicles through smartphone sensing data fusion. Next, the details of the proposed anomaly detection algorithm for abnormal following vehicle detection are provided.

Sensor Fusion-Based Anomaly Detection

After obtaining the following vehicle's following time and the target vehicle's critical driving behavior within the following time, we adopt Local Outlier Factor (LOF) is adopted as the anomaly detection algorithm to detect the abnormal following vehicles, which has demonstrated good performance on anomaly detection. To do so, the following vehicle's following time is aligned to the test vehicle's critical driving behavior (CDB) for accurate CDB extraction within each following vehicle's following time. Then, the LOF algorithm is used to derive the anomaly score of the following vehicle, which will be used to detect the abnormal following vehicles.

Sensor Data Alignment: After obtaining the camera sensing data and over-time gyroscope readings, these two data streams are first synchronized. To do so, before starting the engine of the test vehicle, the camera and IMU sensors record the sensing data. When the test vehicle is moving, the recorded rear view from the camera and IMU sensing readings will change. So, these two data streams can be synchronized by detecting their over-time variations.

Unsupervised Anomaly Detection Using Local Outlier Factor: The main idea of LOF algorithm is to compute the anomaly score of the sample that is called LOF. LOF measures the local deviation of the density of the given sample in comparison to its neighbors. The locality is calculated from k-nearest neighbors (k is set to be 20 in our experiments), whose distance is leveraged to estimate the local density. Then, the abnormal objects are identified, whose local density is substantially lower than their neighbors. LOF of a sample s is defined as follows [21]:

$$LOF_m(s) = \frac{\sum_{0 \in N_m(s)} \frac{lrd_m(s)}{lrd_m(o)}}{|N_m(s)|} \quad (2)$$

where m is a parameter specifying the minimum number of samples around sample s. $N_m(s)$ is denoted as the m-distance neighborhood of sample s, which is defined as $N_m(s) = \{q \in D \setminus \{s\} | d(s, q) \leq m\text{-distance}(s)\}$. D denotes the dataset. $d(s, q)$ denotes the distance between s and q·m−distance(s) is denoted as m-distance of sample s, which is defined as the distance between s and $0 \in D$ such that (i) $d(s, o') \leq d(s, o)$ for at least m samples $o' \in D \setminus \{s\}$ and (ii) $d(s, o') \leq d(s, o)$ for at most m−1 samples $o' \in D \setminus \{s\} \cdot lrd_m(s)$ denotes the local reachability density of sample s, which is defined as follows [21]:

$$lrd_m(s) = 1 \bigg/ \left( \frac{\sum_{0 \in N_m(s)} \text{reach} - dist_m(s, o)}{|N_m(s)|} \right) \quad (3)$$

where reach−$dist_m(s, o) = \max \{m\text{−distance}(o), d(s, o)\}$. As shown above, LOF of sample s is the average ratio of the local reachability density of sample s to the local reachability density of its m-nearest neighbors. The theoretical analysis of LOF's advantages over the other anomaly detection algorithms (e.g., OC-SVM and Isolation forests) can be found in [21]. Then, the anomaly score of each sample is derived for the abnormal following vehicle detection.

Implementation and Experimental Settings

Hardware and System Deployment: Experiments were conducted with a smartphone (i.e., Motorola® Moto E) which includes a camera and IMU sensors. The smartphone was deployed on the rear deck or rear windshield of the test vehicle (i.e., Honda Civic®, CRV®, Subaru Crosstrek®, etc.) to film the rear view of the test vehicle for the following time estimation of the following vehicles and read gyroscope data streams for our vehicle's critical driving behavior detection. Note that the smartphone can capture the full rear view of the test vehicle (like driving recorder). As we can see from FIG. 4H and FIG. 5A, FIG. 5B, FIG. 5C, and FIG. 5D, the smartphone's camera was able to detect all the following vehicles behind the test vehicle.

Software and Implementation: To extract the sensing data from the smartphone, two off-the-shelf Android apps were used for video and IMU sensing data recording respectively. Specifically, the Background Video Recorder (BVR)[22] was used for video recording and phyphox [23] for IMU sensing data recording with a sampling rate of 100 Hz. After recording the data streams, the following time and critical driving behavior was extracted with Python for signal processing and data analysis. A pre-trained deep neural network model proposed in was used to track and identify the following vehicles. The LOF-based anomaly detection algorithm is also implemented with Python using sklearn for the abnormal following vehicle detection. An OptiPlex 7050 Dell desktop running Ubuntu 16.04 OS on Intel CORE i7 CPU was used for video data processing with YOLO.

System Evaluation

Experimental Details: To evaluate the performance of the P2D2 system, vehicles were driven on the road during our daily traffic commute, which can cover all our daily activities (e.g., grocery shopping, going to work, going to the shopping mall, going out for lunch/dinner, etc.) when we use the test vehicle for daily traffic commute. FIG. 4G is a map showing the driving path in the local area during data collection. The value of parameter m in LOF is set as 20, and the algorithm used for computing the nearest neighbors is configured to be automatically decided based on the data set.

Evaluation Metrics: To measure the system performance, the normalized confusion matrix, accuracy, precision, recall, and F−1 score for the abnormal following vehicle detection are presented. Accuracy is defined as the ratio of the correct detection to the total detection. Precision is defined as the ratio of true positive detection to total positive detection. Recall indicates the sensitivity that is defined as the ratio of true positive detection to the total actual positive instances. The F−1 score is the harmonic mean between precision and recall. Moreover, the receiver operating characteristic (ROC) curve and precision-recall (PR) curve are presented to characterize the performance of our anomaly detection algorithm in comparison to the random guess. The LOF-based anomaly detection algorithm is also compared with OC-SVM and Isolation forest algorithms.

Microbenchmark

Figures 4H, 4I:
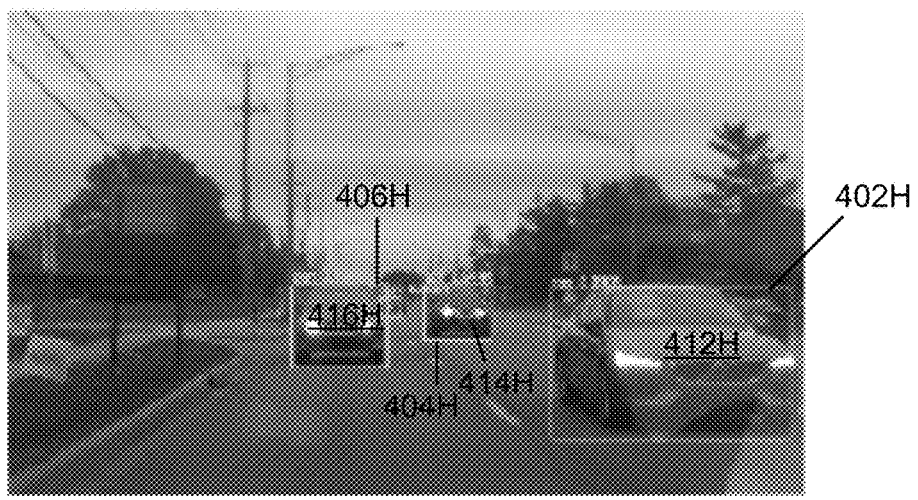
FIG. 4H are results from a study showing bounding boxes for a plurality of detected following vehicles.
FIG. 4I is a table showing performance metrics of various algorithms.
Figure 5B:
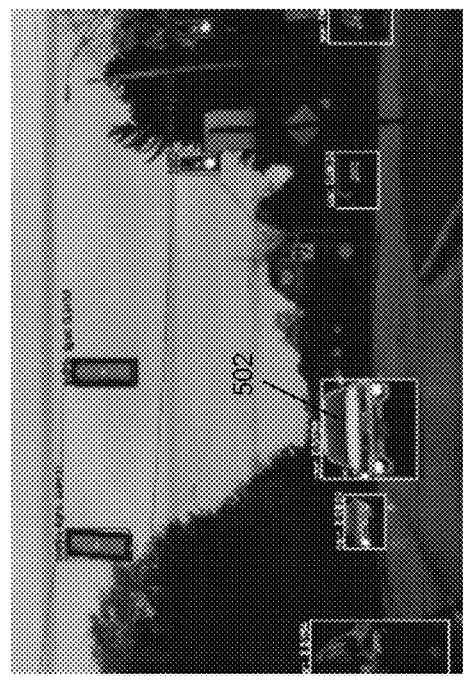
FIG. 5A, FIG. 5B, FIG. 5C, and FIG. 5D are a series of images from a study demonstrating detection of following vehicles over continuous video frames.
Figure 5D:
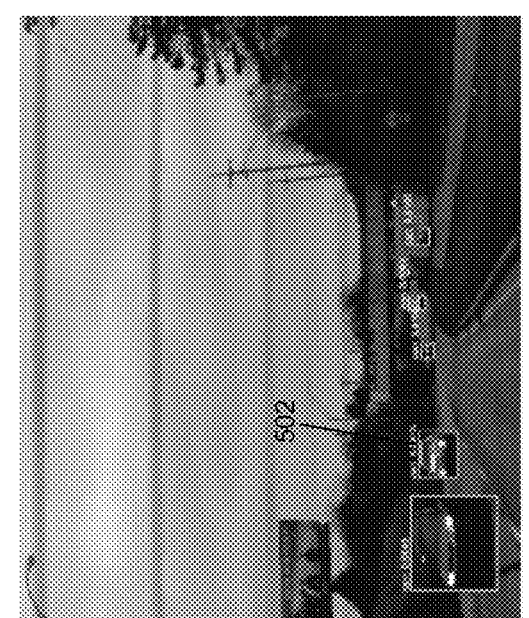
Figure 5A:
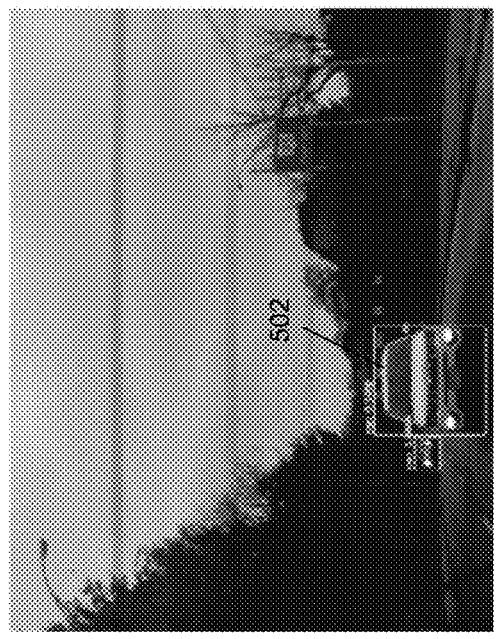
Figure 5C:
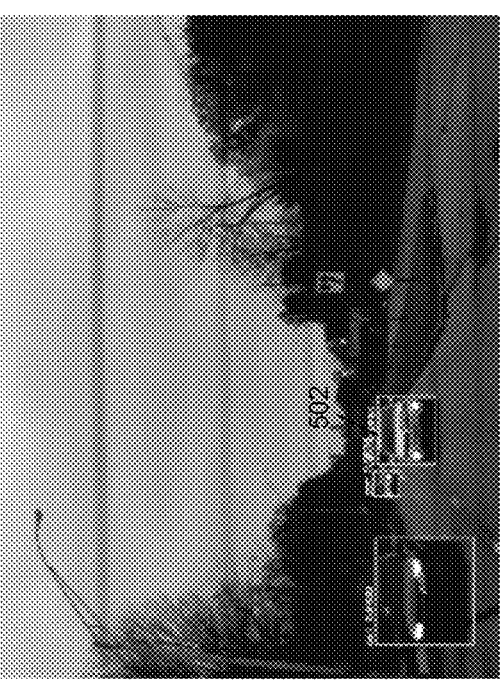

Effectiveness of the Following Vehicle Tracking: To demonstrate the performance of YOLO on vehicle identification and tracking, vehicles were driven on the road and used the smartphone mounted in the test vehicle to monitor the rear view of our vehicle. Then, we use YOLO [13] to track and identify the following vehicles. As shown in FIG. 4H, YOLO can accurately identify each following vehicle and highlight the bounding box 402H, 404H, 406H of each detected following vehicle 412H, 414H, 416H.

Furthermore, YOLO can continuously detect the following vehicles as shown in FIGS. 5A-5D. FIGS. 5A-5D are a sequence of images showcasing the following vehicle identification and tracking over continuous video frames. The following vehicles are detected and highlighted with the bounding box accurately over four-time snapshots. As shown, a first following vehicle 502 and its corresponding bounding box is accurately tracked in FIGS. 5A-5D. Note that YOLO algorithm can also detect and track other road infrastructures such as traffic lights, passengers, and cyclists.

Figures 6A, 6B, 6C, 6D:
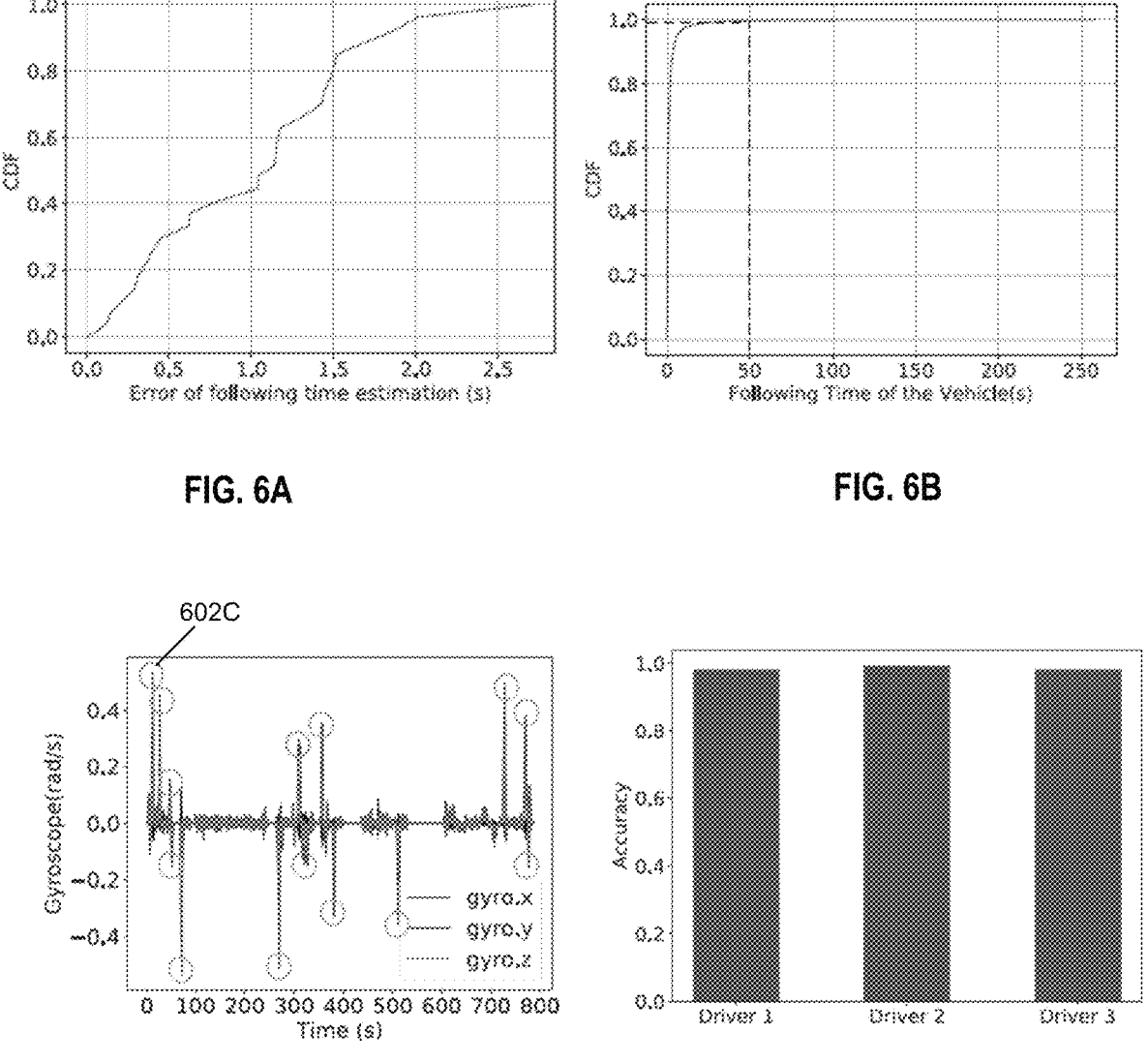
FIG. 6A is a graph depicting following time estimation error plotted against CDF.
FIG. 6B is a graph showing the CDF of the following time of the following vehicles.
FIG. 6C is a graph showing gyroscope readings over time obtained during a study hat was conducted.
FIG. 6D is a graph showing results that confirm the accuracy of critical driving behavior (CDB) detection methods in accordance with certain implementations described herein.

Effectiveness of Following Time Estimation: The following time of each following vehicle is the time duration when this vehicle appears in the field-of-view of the camera. Since each following vehicle can be accurately tracked, each following vehicle's following time can be obtained as discussed herein. FIG. 6A is a graph depicting following time estimation error plotted against CDF.

As shown, the average following time estimation error is around 1.1 s, and the maximum following time estimation error is around 2.5 s due to the inaccurate following vehicle tracking with YOLO algorithm. Then, the following time of each following vehicle is further estimated when the test vehicle is driven on the road during the daily traffic commute. FIG. 6B is a graph showing the CDF of the following time of the following vehicles. It was found that 99% of the following time is less than 50 seconds, indicating that the following vehicles are usually not following the test vehicle for a long period of time due to the different driving destinations and driving behaviors. However, there are still some cases, in which the following vehicles are following the test vehicle for about 5 minutes due to a one-lane road, slow traffic, the same driving path to the same destination (e.g., grocery store), and the like.

Effectiveness of Number of Critical Driving Behavior

Detection: The effectiveness of the critical driving behavior detection methods disclosed herein were demonstrated by using the proposed methods to detect critical driving behavior such as making left/right turns. FIG. 6C is a graph showing gyroscope readings over time obtained during a study that was conducted. Data corresponding with the detected critical driving behavior is indicated by orange circles, for example, first circle 602C.

The proposed detection approach can accurately detect critical driving behaviors (e.g., making left/right turns) which can significantly change the gyroscope readings over the y-axis or z-axis, FIG. 6D is a graph showing results that confirm the accuracy of CDB detection methods described herein, which is defined as the number of correct detections over the total number of CDBs during driving. As shown, the accuracy of the proposed CDB detection method is around 0.99, which indicates the efficiency of our CDB detection approach. The results in FIG. 6D demonstrate the efficacy of the CDB approach which harnesses gyroscope sensing data across different axes to remove road condition artifacts.

Furthermore, the number of critical driving behaviors within each normal following vehicle's following time is statistically showcased. FIG. 6E is a graph showing the CDF of the number of critical driving behaviors within the normal following vehicle's following time period. As shown, the 95th percentile number of critical driving behaviors is three. Empirically, this indicates that the normal following vehicles will not follow us after we make more than three critical driving behaviors (e.g., making left/right turns). However, the graph also shows that some normal following vehicles will still follow a target vehicle after four critical driving behaviors in certain circumstances. For example, the target vehicle may share the same driving path with some of the normal following vehicles.

Performance of Abnormal Following Vehicle Detection

Performance of LOF-based Anomaly Detection Algorithm: To evaluate the performance of the LOF-based anomaly detection algorithm while varying the threshold (i.e., cut-off probability), FIG. 6F and FIG. 6G are graphs showing a receiver operating characteristic (ROC) curve and precision-recall (PR) curve of the proposed anomaly detection algorithm, respectively. As demonstrated in FIG. 6F and FIG. 6G, the proposed anomaly detection algorithm is significantly better than the reference line (i.e., random guess). Note, the area under curve (AUC) for ROC (FIG. 6F) and PR curves (FIG. 6G) is 97.88% and 99.69% respectively. FIG. 6H shows a normalized confusion matrix corresponding with the proposed anomaly detection algorithm. As shown, the anomaly detection algorithm has a high true positive rate and true negative rate, which indicates the efficiency of the proposed algorithm in detecting the abnormal following vehicles.

However, FIG. 6H also shows that the algorithm has a false negative rate of 0.03, which indicates that some normal following vehicles will be detected as abnormal following vehicles. FIG. 6H also shows that some abnormal following vehicles will be detected as normal following vehicles, as the false positive rate is 0.12. This may be attributable to some normal or abnormal following vehicles may simply follow a target vehicle for a period of time due to the same driving destination, slow traffic flow, single-track road, etc.

Comparison with the Other Anomaly Detection Algorithms: The performance metrics of LOF, OC-SVM, and Isolation forest algorithms are presented in FIG. 4I (Table I). As shown, the accuracy, precision, recall, and F−1 score for the abnormal following vehicle detection using LOF are 0.95, 0.98, 0.97, and 0.97 respectively, which is better than the performance of OC-SVM and Isolation forest algorithms. This is because the LOF anomaly detection algorithm measures the local deviation of the density of the given sample to its neighbors, which can characterize two facts about the abnormal following vehicles as discussed above.

Figures 6I, 6J, 6K:
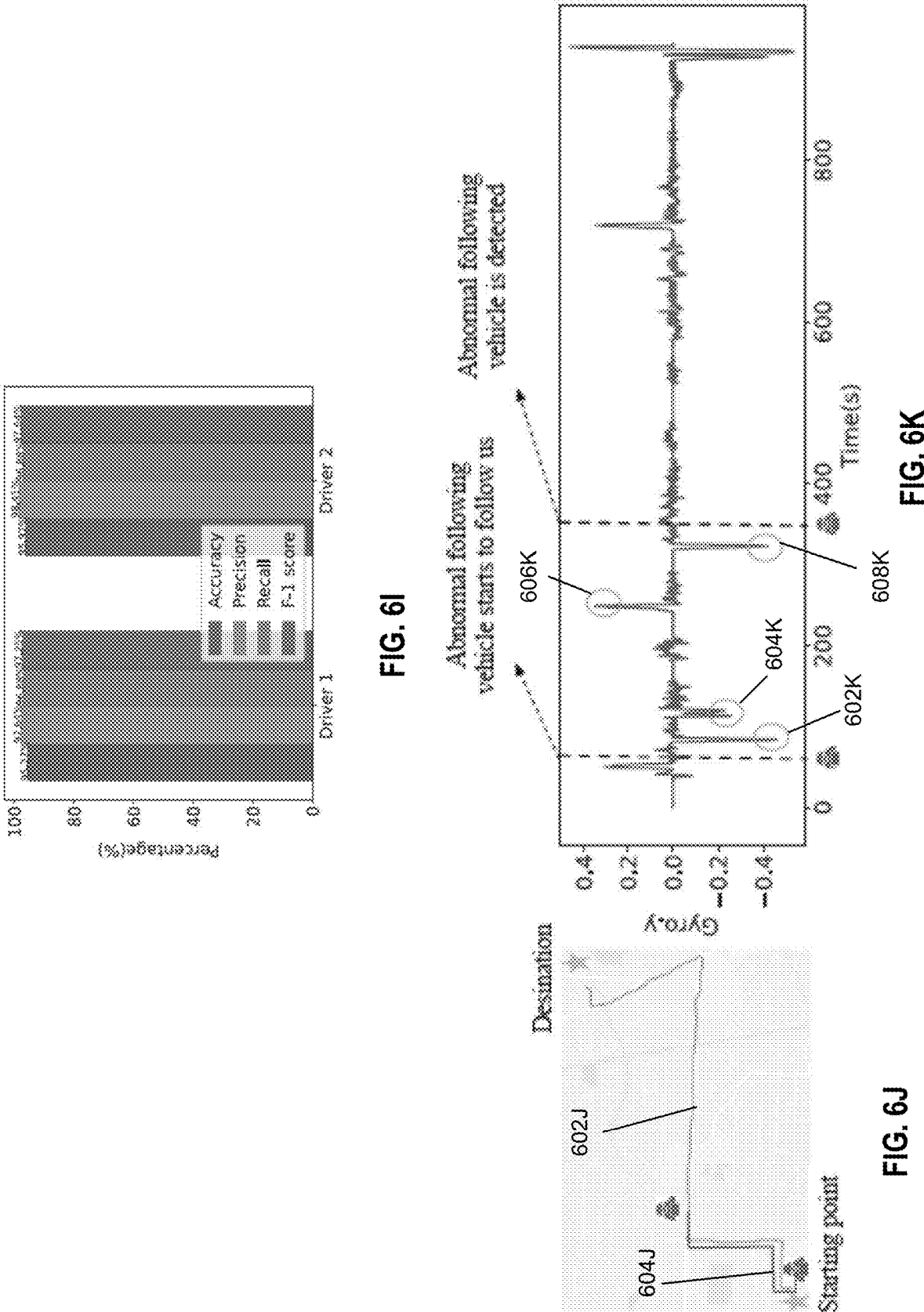
FIG. 6I is a graph showing the accuracy, precision, recall, and F−1 score of abnormal following vehicle detection across two drivers.
FIG. 6J depicts respective driving paths of a target vehicle and an abnormal following vehicle from a conducted study.
FIG. 6K is graph showing gyroscope readings along the y-axis over time from a conducted study.

Performance across Different Drivers: The performance of the abnormal following vehicle detection across two drivers during their daily traffic commute were measured in conducted experiments. FIG. 6I is a graph showing the accuracy, precision, recall, and F−1 score of abnormal following vehicle detection across two drivers. As shown, the performance of the two drivers is close (i.e., the value of evaluation metrics is around 95% for each driver), indicating that the proposed anomaly detection algorithm performs accurately independent of different drivers (e.g., driving styles or patterns). This is because the abnormal following vehicles are distinguished from the normal vehicles on the following time and critical driving behaviors, which are independent of the driver's driving pattern.

Case Study

A study was conducted to demonstrate the efficacy of the proposed abnormal following vehicle detection methods. A test vehicle was driven for grocery shopping with the P2D2 system deployed in the vehicle with a goal of uncovering an abnormal following vehicle using the proposed anomaly detection algorithm.

Referring to FIG. 6J, respective driving paths of the target vehicle 602J and the abnormal following vehicle 604J are shown when the target vehicle is driven from home to the grocery store. FIG. 6K is a graph showing gyroscope readings along the y-axis over time, which were collected from the smartphone deployed in the test vehicle.

For the sake of simplicity, only the detection of the abnormal following vehicles during driving is analyzed. As shown in FIG. 6K, there is one vehicle following the test vehicle starting at 40 s. After detecting four critical driving behaviors (i.e., indicated by the circles 602K, 604K, 606K, 608K) of the target vehicle, the following vehicle still follows the test vehicle. The system determines whether the following vehicle is stalking the test vehicle using the LOF anomaly detection algorithm based on the following vehicle's following time and the test vehicle's critical driving behavior within the following time. As such, the abnormal following vehicle is identified at 380 s in FIG. 6K. Intuitively, this is because the following vehicle is still following the test vehicle after the test vehicle makes four turns. Within 380 s, the following vehicle is identified as a normal following vehicle due to a small number (e.g., below-threshold number) of CDBs within its following time.

With the development of modern vehicles, especially autonomous vehicles, there are many works focusing on the security and privacy analysis of autonomous vehicles. These works mainly target either the vulnerability of the machine learning models [25], [26], [27], [28] employed by the autonomous vehicles or the LiDAR/Camera sensors' vulnerability [29], [30], [31]. For example, Poltergeist [29] exploits the vulnerability of IMU sensors on acoustic adversarial examples in the modern camera against vision-based autonomous driving. Sun et al. [25] and Cao et al. [26] exploit the vulnerability of LiDAR-based machine learning models employed by autonomous vehicles. Recently, Cao et al. [27] exploits the vulnerability of LiDAR and camera sensor fusion-based machine learning models employed by autonomous vehicles.

The methods and systems disclosed herein are fundamentally different from these prior works. First, these prior works focus on what happened at the front of the vehicle, while we target the privacy issue of what is happening in the rear of the vehicle. Second, these prior works mainly analyze the vulnerability of autonomous vehicles instrumented with advanced sensors (e.g., LiDAR and camera) and deep neural networks, while our work discusses an important and common privacy leakage issue in driving scenarios.

Driver authentication [32], [33], [34], [35] has been extensively exploited for privacy-preserving applications, while the present disclosure mainly focuses on eavesdropping from the other vehicles behind a target vehicle.

Embodiments of the present disclosure provide P2D2, the first privacy-preserving defensive driving system that can detect abnormal following vehicles during driving with sensor fusion. In some implementations, a camera is used to estimate the following time of the following vehicles and sensors (e.g., IMU sensors) are used to detect a target vehicle's critical driving behavior with the road surface artifacts removal approach described herein. An anomaly detection algorithm for detecting abnormal following vehicles based on the following time and critical driving behavior are described herein. Extensive experiments demonstrate the effectiveness of P2D2 on uncovering abnormal following vehicles.

Configuration of Certain Implementations

The construction and arrangement of the systems and methods as shown in the various implementations are illustrative only. Although only a few implementations have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions, and arrangement of the implementations without departing from the scope of the present disclosure.

The present disclosure contemplates methods, systems, and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another implementation includes ¬ from the one particular value and/or to the other particular value. Similarly, when values are expressed as approximations, by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal implementation. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific implementation or combination of implementations of the disclosed methods.

The following patents, applications and publications as listed below and throughout this document are hereby incorporated by reference in their entirety herein.

[1] L. Steele, "How much time do american families spend in their cars?" https://www.fatherly.com/gear/how-much-time-do-american-families-spend-in-their-cars/, 2022.

[2] CDC, "Violence prevention," https://www.cdc.gov/violenceprevention/intimatepartnerviolence/stalking/fact.html, 2022.

[3] J. McNabb, M. Kuzel, and R. Gray, "I'll show you the way: Risky driver behavior when "following a friend"," Frontiers in psychology, vol. 8, p. 705, 2017.

[4] A. U. Nambi, A. Virmani, and V. N. Padmanabhan, "Farsight: a smartphone-based vehicle ranging system," Proceedings of the ACM on Interactive, Mobile, Wearable and Ubiquitous Technologies, vol. 2, no. 4, pp. 1-22, 2018.

[5] L. A. Pipes, "An operational analysis of traffic dynamics," Journal of applied physics, vol. 24, no. 3, pp. 274-281, 1953.

[6] Y. Peng, S. Liu, and Z. Y. Dennis, "An improved car-following model with consideration of multiple preceding and following vehicles in a driver's view," Physica A: Statistical Mechanics and Its Applications, vol. 538, p. 122967, 2020.

[7] R. E. Chandler, R. Herman, and E. W. Montroll, "Traffic dynamics: studies in car following," Operations research, vol. 6, no. 2, pp. 165-184, 1958.

[8] W. Sun and K. Srinivasan, "On the feasibility of securing vehicle-pavement interaction," Proceedings of the ACM on Interactive, Mobile, Wearable and Ubiquitous Technologies, vol. 6, no. 1, pp. 1-24, 2022.

[9] T. Sun, "10 most irritating things drivers do," https://www.thesun.co.uk/motors/3581304/what-grinds-motorists-gears-the-most-irritating driving-habits-revealed/, 2017.

[10] W. Sun and K. Srinivasan, "Allergie: Relative vehicular localization with commodity rfid system," in 2020 IEEE International Conference on RFID (RFID). IEEE, 2020, pp. 1-8.

[11] S. Li, X. Fan, Y. Zhang, W. Trappe, J. Lindqvist, and R. E. Howard, "Auto++ detecting cars using embedded microphones in real-time," Proceedings of the ACM on Interactive, Mobile, Wearable and Ubiquitous Technologies, vol. 1, no. 3, pp. 1-20, 2017.

[12] W. Jin, S. Murali, Y. Cho, H. Zhu, T. Li, R. T. Panik, A. Rimu, S. Deb, K. Watkins, X. Yuan et al., "Cycleguard: A smartphone-based assistive tool for cyclist safety using acoustic ranging," Proceedings of the ACM on Interactive, Mobile, Wearable and Ubiquitous Technologies, vol. 5, no. 4, pp. 1-30, 2021.

[13] J. Redmon and A. Farhadi, "Yolov3: An incremental improvement," arXiv preprint arXiv:1804.02767, 2018.

[14] A. Sarda, S. Dixit, and A. Bhan, "Object detection for autonomous driving using yolo [you only look once] algorithm," in 2021 Third International Conference on Intelligent Communication Technologies and Virtual Mobile Networks (ICICV). IEEE, 2021, pp. 1370-1374.

[15] R.-C. Chen, V. S. Saravanarajan, H.-T. Hung et al., "Monitoring the behaviours of pet cat based on yolo model and raspberry pi," International Journal of Applied Science and Engineering, vol. 18, no. 5, pp. 1-12, 2021.

[16] S. S. Sumit, J. Watada, A. Roy, and D. Rambli, "In object detection deep learning methods, yolo shows supremum to mask r-cnn," in Journal of Physics: Conference Series, vol. 1529, no. 4. IOP Publishing, 2020, p. 042086.

[17] T.-Y. Lin, M. Maire, S. Belongie, J. Hays, P. Perona, D. Ramanan, P. Dollár, and C. L. Zitnick, "Microsoft coco: Common objects in context," in European conference on computer vision. Springer, 2014, pp. 740-755.

[18] "Yolo pretrained model," https://pjreddie.com/darknet/yolo/, 2022.

[19] D. Chen, K.-T. Cho, S. Han, Z. Jin, and K. G. Shin, "Invisible sensing of vehicle steering with smartphones," in Proceedings of the 13th Annual International Conference on Mobile Systems, Applications, and Services, 2015, pp. 1-13.

[20] R. W. Schafer, "What is a savitzky-golay filter?[lecture notes]," IEEE Signal processing magazine, vol. 28, no. 4, pp. 111-117, 2011.

[21] M. M. Breunig, H.-P. Kriegel, R. T. Ng, and J. Sander, "Lof: identifying density-based local outliers," in Proceedings of the 2000 ACM SIGMOD international conference on Management of data, 2000, pp. 93-104.

[22] G. Play, "Background video recorder (bvr)," https://play.google.com/store/apps/details?id=com.camera.secretvideorecorder&hl=en US&gl=US, 2022.

[23] _____, "phyphox," https://phyphox.org/, 2022.

[24] sklearn, "Local outlier factor algorithm in sklearn," https://scikitlearn.org/stable/modules/generated/sklearn-.neighbors.LocalOutlierFactor.html, 2022.

[25] J. Sun, Y. Cao, Q. A. Chen, and Z. M. Mao, "Towards robust {LiDAR-based} perception in autonomous driving: General black-box adversarial sensor attack and countermeasures," in 29th USENIX Security Symposium (USENIX Security 20), 2020, pp. 877-894.

[26] Y. Cao, C. Xiao, B. Cyr, Y. Zhou, W. Park, S. Rampazzi, Q. A. Chen, K. Fu, and Z. M. Mao, "Adversarial sensor attack on lidar-based perception in autonomous driving," in Proceedings of the 2019 ACM SIGSAC conference on computer and communications security, 2019, pp. 2267-2281.

[27] Y. Cao, N. Wang, C. Xiao, D. Yang, J. Fang, R. Yang, Q. A. Chen, M. Liu, and B. Li, "Invisible for both camera and lidar: Security of multi-sensor fusion based perception in autonomous driving under physical-world attacks," in 2021 IEEE Symposium on Security and Privacy (SP). IEEE, 2021, pp. 176-194.

[28] T. Sato, J. Shen, N. Wang, Y. Jia, X. Lin, and Q. A. Chen, "Dirty road can attack: Security of deep learning based automated lane centering under {Physical-World} attack," in 30th USENIX Security Symposium (USENIX Security 21), 2021, pp. 3309-3326.

[29] X. Ji, Y. Cheng, Y. Zhang, K. Wang, C. Yan, W. Xu, and K. Fu, "Poltergeist: Acoustic adversarial machine learning against cameras and computer vision," in 2021 IEEE Symposium on Security and Privacy (SP). IEEE, 2021, pp. 160-175.

[30] C. Yan, W. Xu, and J. Liu, "Can you trust autonomous vehicles: Contactless attacks against sensors of self-driving vehicle," Def Con, vol. 24, no. 8, p. 109, 2016.

[31] J. Shen, J. Y. Won, Z. Chen, and Q. A. Chen, "Drift with devil: Security of {Multi-Sensor} fusion based localization in {High-Level} autonomous driving under {GPS} spoofing," in 29th USENIX Security Symposium (USENIX Security 20), 2020, pp. 931-948.

[32] L. He, Y. Shu, Y. Lee, D. Chen, and K. G. Shin, "Authenticating drivers using automotive batteries," Proceedings of the ACM on Interactive, Mobile, Wearable and Ubiquitous Technologies, vol. 4, no. 4, pp. 1-27, 2020.

[33] A. M. Guzman, M. Goryawala, J. Wang, A. Barreto, J. Andrian, N. Rishe, and M. Adjouadi, "Thermal imaging as a biometrics approach to facial signature authentication," IEEE journal of biomedical and health informatics, vol. 17, no. 1, pp. 214-222, 2012.

[34] S. Hu, J. Choi, A. L. Chan, and W. R. Schwartz, "Thermal-to-visible face recognition using partial least squares," JOSA A, vol. 32, no. 3, pp. 431-442, 2015.

[35] G. Zheng, C.-J. Wang, and T. E. Boult, "Application of projective invariants in hand geometry biometrics," IEEE transactions on Information Forensics and Security, vol. 2, no. 4, pp. 758-768, 2007.

What is claimed is:

1. A system for detecting abnormal following vehicles, the system comprising:

at least one sensor configured to detect motion data of a first vehicle along the x-axis, y-axis, and z-axis;

a camera positioned within the first vehicle such that a field-of-view (FOV) of the camera faces outward from a rear of the first vehicle;

a user interface;

a processor;

memory having instructions stored thereon that, when executed by the processor, cause the system to:

continuously capture video data of the camera's FOV;

detect following vehicles in the captured video data using an object detection model;

determine an amount of time that each of the following vehicles follows the first vehicle, wherein the amount of time ($T_{ID}$) that each of the following vehicles follows the first vehicle is calculated as:

$$T_{ID} = \frac{N_L - N_F}{f_r}$$

where $f_r$ denotes a frame rate of the camera, $N_F$ denotes a time that the respective following vehicle was first detected in the video data, and $N_L$ denotes a time that the respective following vehicle is no longer detected in the video data;

determine critical driving behavior of the first vehicle based at least in part on a measure of variation in the detected motion data over the y-axis or z-axis, wherein determining the critical driving behavior comprises filtering noise and removing road condition artifacts from the motion data across at least one coordinate system axis;

perform a sensor fusion operation to synchronize the video data and the filtered motion data based on detected time variations to determine whether one or more of the following vehicles is exhibiting abnormal following behavior with respect to the first vehicle based on the amount of time that each of the following vehicles follows the first vehicle and the determined critical driving behavior of the first vehicle; and responsive to determining that one or more of the following vehicles is exhibiting abnormal following behavior, generate and output an audio or visual alert or output driving instructions to a designated safe location via the user interface.

2. The system of claim 1, wherein the at least one sensor comprises an inertial measurement unit (IMU).

3. The system of claim 1, wherein the at least one sensor, camera, processor, user interface, and memory are components of a smartphone.

4. The system of claim 1, wherein one or more of the at least one sensor, camera, processor, user interface, and memory are components of a vehicle computer.

5. The system of claim 1, wherein the object detection model is a deep convolution neural network.

6. The system of claim 1, wherein the object detection model is a You Only Look Once (YOLO) algorithm.

7. The system of claim 1, wherein the noise is filtered from the motion data using a Savitzky-Golay filter.

8. The system of claim 1, wherein to determine whether one or more of the following vehicles is exhibiting abnormal following behavior with respect to the first vehicle based on the amount of time that each of the following vehicles follows the first vehicle and the critical driving behavior of the first vehicle, the instructions cause the system to:

determine an anomaly score for each of the following vehicles based on the critical driving behavior of the first vehicle within respective amounts of time that each of the following vehicles were following the first vehicle.

9. The system of claim 8, wherein the anomaly scores are determined using a Local Outlier Factor (LOF) algorithm.

10. The system of claim 1, wherein the instructions further cause the system to alert an operator of the first vehicle if one or more of the following vehicles is determined to exhibit abnormal following behavior.

11. A method for detecting abnormal following vehicles, the method comprising:

obtaining motion data for a first vehicle via at least one sensor along the x-axis, y-axis, and z-axis;

continuously capturing video data of a rear FOV of the first vehicle via a second sensor;

detecting one or more following vehicles in the captured video data using an object detection model;

determining an amount of time that each of the following vehicles follows the first vehicle, wherein the amount of time ($T_{ID}$) that each of the following vehicles follows the first vehicle is calculated as:

$$T_{ID} = \frac{N_L - N_F}{f_r}$$

where $f_r$ denotes a frame rate of the second sensor, $N_F$ denotes a time that the respective following vehicle was first detected in the video data, and $N_L$ denotes a time that the respective following vehicle is no longer detected in the video data;

determining critical driving behavior of the first vehicle based at least in part on a measure of variation in the motion data over the y-axis or z-axis, wherein determining the critical driving behavior comprises filtering noise and removing road condition artifacts from the motion data across at least one coordinate system axis;

performing a sensor fusion operation to synchronize the video data and the filtered motion data based on detected time variations to determine whether one or more of the following vehicles is exhibiting abnormal following behavior with respect to the first vehicle based on the amount of time that each of the following vehicles follows the first vehicle and the determined critical driving behavior of the first vehicle; and responsive to determining that one or more of the following vehicles is exhibiting abnormal following behavior, generating and outputting an audio or visual alert or outputting driving instructions to a designated safe location via a user interface.

12. The method of claim 11, wherein the object detection model comprises at least one of a deep convolution neural network or a YOLO algorithm.

* * * * *